United States Patent
Chen et al.

(10) Patent No.: US 12,154,319 B2
(45) Date of Patent: Nov. 26, 2024

(54) SYSTEM AND METHOD FOR DOMAIN GENERALIZATION ACROSS VARIATIONS IN MEDICAL IMAGES

(71) Applicant: Carnegie Mellon University, Pittsburgh, PA (US)

(72) Inventors: Edward Chen, Stanford, CA (US); John Galeotti, Pittsburgh, PA (US); Howie Choset, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/036,737

(22) PCT Filed: Nov. 15, 2021

(86) PCT No.: PCT/US2021/059356
§ 371 (c)(1),
(2) Date: May 12, 2023

(87) PCT Pub. No.: WO2022/104194
PCT Pub. Date: May 19, 2022

(65) Prior Publication Data
US 2024/0029410 A1    Jan. 25, 2024

Related U.S. Application Data

(60) Provisional application No. 63/113,397, filed on Nov. 13, 2020.

(51) Int. Cl.
*G06V 10/774* (2022.01)
*G06V 10/82* (2022.01)
*G06N 3/0464* (2023.01)

(52) U.S. Cl.
CPC ............ *G06V 10/774* (2022.01); *G06V 10/82* (2022.01); *G06N 3/0464* (2023.01); *G06V 2201/03* (2022.01)

(58) Field of Classification Search
CPC .. G06V 10/774; G06V 10/82; G06V 2201/03; G06N 3/0464; G06N 3/045;
(Continued)

(56) References Cited

U.S. PATENT DOCUMENTS

2005/0025355 A1   2/2005   Simard et al.
2010/0165087 A1   7/2010   Corso et al.
(Continued)

FOREIGN PATENT DOCUMENTS

WO   2017149310 A1   9/2017

*Primary Examiner* — Bobbak Safaipour
(74) *Attorney, Agent, or Firm* — The Webb Law Firm

(57) ABSTRACT

Provided is a method of training a machine-learning-based artificial intelligence (AI) model to handle diverse types of motions occurring during image acquisition, including capturing image data including motion between an imaging device and tissue, modifying the captured image data, resulting in modified image data, by at least one of: altering an amount of time between any two frames; removing a subsequence of frames from the captured image data; and adding a subsequence of one or more new frames to the captured image data, and training a machine-learning-based AI model based on the modified image data. Other systems and methods are also described.

19 Claims, 10 Drawing Sheets

(58) Field of Classification Search
CPC .......... G06N 3/047; G06N 3/082; G06N 7/01; G06N 20/00; G16H 30/00
See application file for complete search history.

(56) References Cited

U.S. PATENT DOCUMENTS

| | | |
|---|---|---|
| 2018/0042566 A1 | 2/2018 | Roffe et al. |
| 2020/0042873 A1* | 2/2020 | Daval Frerot .......... G06N 3/048 |
| 2020/0077023 A1* | 3/2020 | Kang .................. H04N 23/6812 |
| 2020/0372639 A1* | 11/2020 | Li ........................ G16H 30/40 |
| 2022/0254139 A1* | 8/2022 | Hiasa ..................... G06V 10/70 |
| 2022/0309771 A1* | 9/2022 | Schorn .................. G06N 3/045 |
| 2022/0319157 A1* | 10/2022 | Lai ........................ G06V 10/774 |

* cited by examiner

SYSTEM AND METHOD FOR DOMAIN GENERALIZATION ACROSS VARIATIONS IN MEDICAL IMAGES

CROSS-REFERENCE TO RELATED APPLICATIONS

This application is the United States national phase of International Application No. PCT/US2021/059356 filed Nov. 15, 2021, and claims priority to U.S. Provisional Patent Application No. 63/113,397 filed Nov. 13, 2020, the disclosures of which are hereby incorporated by reference in their entireties.

GOVERNMENT LICENSE RIGHTS

This invention was made with United States government support under W81XWH-19-C-0083 awarded by the U.S. Army Medical Research Activity. The U.S. Government has certain rights in the invention.

BACKGROUND

1. Field

This disclosure relates generally to ultrasound image processing and, in non-limiting embodiments or aspects, to systems and methods for domain generalization across variations in medical images.

2. Technical Considerations

Ultrasound has become an increasingly popular technique for medical imaging. For example, ultrasound may be relatively low risk (e.g., relatively few potential side-effects and/or the like), portable, radiation free, relatively inexpensive (e.g., compared to other types of medical image), and/or the like.

Many machine learning techniques such as deep learning have been used to analyze ultrasound images in different scenarios. Deep learning techniques and recent advances have allowed increased model performance in real-time ultrasound imaging scenarios up to or above the level of human skill. However, this performance increase is generally only applicable within a single domain, such as anatomy, scanner types, imaging settings, probe position, and external artifacts. Within the field of medical imaging, specifically with ultrasound, real-life scenarios may present challenges for traditionally trained deep learning models.

Certain types of anatomies, imaging settings, or injury scenarios present new data which has not previously been seen by a trained deep learning model. For example, in emergency scenarios, a medical professional may be using faster and more erratic scanning methods to capture real-time ultrasound images. In order to train a model on all possible scenarios, a massive amount of medical imaging data would be required. However, medical imaging datasets are often limited in quantity and span a restricted distribution. Deep learning models trained on pre-existing medical imaging data often perform poorly when tested on data from different anatomic areas, scanner settings, or imaging scenarios that are often found in real-life situations. The models are unable to generalize to out-of-training-distribution data and unseen images. This may limit the real-world use cases for such deep learning models. Additionally, collecting the required data to properly train a deep learning model, spanning all the possible scenarios, would be incredibly time-consuming and expensive. Obtaining properly labeled ultrasound data under different scanning rates and imaging conditions for model training is impractical.

Some temporal data augmentation methods include window warping where temporal shifts are addressed in image data by dropping a constant number of data points within each data sequence, thereby expanding temporal horizons in the data. However, window warping and other methods do not address rapid and/or unpredictable changes in ultrasound imaging.

In order to address some of these problems, different data augmentation strategies may be used on ultrasound image datasets. However, data augmentation strategies do not currently exist which actively generalize across temporal-based imaging modalities, spatial anatomical variations, scanning procedures, imaging settings, or other perceptible differences in real-time medical imaging. Current data augmentation techniques are generally limited to simple static transformations such as rotations, flips, skews, and blurs. However, these simple transformations do not allow the data augmentation strategy to adapt to the current state of the deep learning model. Ultrasound images provide a certain set of challenges as the training data distribution can be vastly different from the distribution at test time. Current simple transformation data augmentation strategies cannot accurately capture these distributions.

SUMMARY

According to non-limiting embodiments or aspects, provided is a method of training a machine-learning-based artificial intelligence (AI) model to handle diverse types of motions occurring during image acquisition, comprising: capturing image data using an imaging device to result in a plurality of frames of captured image data, the captured image data comprising motion between the imaging device and the tissue; modifying, with a computing device, the captured image data, resulting in modified image data, by at least one of: altering an amount of time between any two frames of the captured image data; removing a subsequence of frames from the captured image data; and adding a subsequence of one or more new frames to the captured image data, each of the one or more new frames comprising at least one of: a copy of at least one frame of the captured image data, a composite frame created from other frames in the captured image data, an interpolated frame generated to appear between other frames in the captured image data, a frame that is not included in the captured image data, or any combination thereof; and training, with a computing device, a machine-learning-based AI model based on the modified image data.

In non-limiting embodiments or aspects, the image data is captured in real-time or was previously captured. In non-limiting embodiments or aspects, modifying the captured image data comprises removing a subsequence of frames from the captured image data, the method further comprising: determining a probability value for each frame of the captured image data; and determining the subsequence of frames of the captured image data by comparing the probability value of each frame to a predetermined probability threshold value. In non-limiting embodiments or aspects, modifying the captured image data comprises removing a subsequence of frames from the captured image data, the method further comprising: selecting a range of frames from the captured image data; generating a random integer having a value greater than or equal to a first frame number of the range of frames and less than or equal to one greater than a final frame of the range of frames; and determining a selected frame for the subsequence of frames based on the random integer. In non-limiting embodiments or aspects, modifying the captured image data comprises adding a subsequence of one or more new frames to the captured image data, the method further comprising: randomly generating a temporal shift of a predetermined length; splitting the captured image data into a plurality of subsequences equaling the predetermined length; generating a random integer for each subsequence of the plurality of subsequences; and spatially shifting at least one of a width and height of at least one frame of each subsequence of the plurality of subsequences based on the random integer corresponding to the subsequence. In non-limiting embodiments or aspects, the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and the machine-learning-based AI model comprises at least one of the following: a convolutional neural network, a recurrent neural network, a long-short-term-memory neural network, a Bayesian network, a Bayesian neural network, a transformer network, an autoencoder network, a deep Boltzmann machine, a deep belief network, a random forest, a Bayesian random forest, a gradient boosted regression tree, or any combination thereof.

According to non-limiting embodiments or aspects, provided is a system for training a machine-learning-based artificial intelligence (AI) to handle diverse types of motions occurring during video acquisition, comprising at least one computing device programmed or configured to: capture image data using an imaging device to result in a plurality of frames of captured image data, the captured image data comprising motion between the imaging device and tissue; modify the captured image data, resulting in modified image data, by at least one of: alter an amount of time between any two images of the captured image data; remove a subsequence of frames from the captured image data; and add a subsequence of one or more new frames to the captured image data, each of the one or more new frames comprising at least one of: a copy of at least one frame of the captured image data, a composite frame created from other frames in the captured image data, an interpolated frame generated to appear to have been between other frames in the captured image data, a frame that is not included in the captured image data, or any combination thereof; and train a machine-learning-based AI model based on the modified image data In non-limiting embodiments or aspects, the image data is captured in real-time or was previously captured. In non-limiting embodiments or aspects, modifying the captured image data comprises removing a subsequence of frames from the captured image data, the at least one computing device further configured to: determine a probability value for each frame of the captured image data; and determine the subsequence of frames of the image data by comparing the probability value of each frame to a predetermined probability threshold value. In non-limiting embodiments or aspects, modifying the captured image data comprises removing a subsequence of frames from the captured image data, the at least one computing device further configured to: select a range of frames from the captured image data; generate a random integer having a value greater than or equal to a first frame number of the range of frames and less than or equal to one greater than a final frame of the range of frames; and determine a selected frame for the subsequence of frames based on the random integer. In non-limiting embodiments or aspects, modifying the captured image data comprises adding a subsequence of one or more new frames to the captured image data, the at least one computing device further configured to: randomly generate a temporal shift magnitude of a predetermined length; split the captured image data into a plurality of subsequences equaling the predetermined length; generate a random integer for each subsequence of the plurality of subsequences; and spatially shift at least one of a width and height of at least one frame of each subsequence of the plurality of subsequences based on the random integer corresponding to the subsequence. In non-limiting embodiments or aspects, the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and the machine-learning-based AI model comprises at least one of the following: a convolutional neural network, a recurrent neural network, a long-short-term-memory neural network, a Bayesian network, a Bayesian neural network, a transformer network, an autoencoder network, a deep Boltzmann machine, a deep belief network, a random forest, a Bayesian random forest, a gradient boosted regression tree, or any combination thereof.

According to non-limiting embodiments or aspects, provided is a computer program product for training a machine-learning-based artificial intelligence (AI) to handle diverse types of motions occurring during video acquisition, comprising at least one non-transitory computer-readable medium including program instructions that, when executed by at least one computing device, cause the at least one computing device to: capture image data using an imaging device to result in a plurality of frames of captured image data, the captured image data comprising motion between the imaging device and tissue; modify the captured image data, resulting in modified image data, by at least one of: alter an amount of time between any two images of the captured image data; remove a subsequence of frames from the captured image data; and add a subsequence of one or more new frames to the captured image data, each of the one or more new frames comprising at least one of: a copy of at least one frame of the captured image data, a composite frame created from other frames in the captured image data, an interpolated frame generated to appear to have been between other frames in the captured image data, a frame that is not included in the captured image data, or any combination thereof; and train a machine-learning-based AI model based on the modified image data.

In non-limiting embodiments or aspects, the image data is captured in real-time or was previously captured. In non-limiting embodiments or aspects, modifying the captured image data comprises removing a subsequence of frames from the captured image data, the program instructions further causing the at least one computing device to: determine a probability value for each frame of the captured image data; and determine the subsequence of frames of the image data by comparing the probability value of each frame to a predetermined probability threshold value. In non-limiting embodiments or aspects, modifying the captured image data comprises removing a subsequence of frames from the captured image data, the program instructions further causing the at least one computing device to: select a range of frames from the captured image data; generate a random integer having a value greater than or equal to a first frame number of the range of frames and less than or equal to one greater than a final frame of the range of frames; and determine a selected frame for the subsequence of frames based on the random integer. In non-limiting embodiments or aspects, modifying the captured image data comprises adding a subsequence of one or more new frames to the captured image data, the program instructions further causing the at least one computing device to: randomly generate a temporal shift magnitude for each subsequence of frames of a predetermined length; split the captured image data into a plurality of subsequences equaling the predetermined length; generate a random integer for each subsequence of the plurality of subsequences; and spatially shift at least one of a width and height of at least one frame of each subsequence of the plurality of subsequences based on the random integer corresponding to the subsequence. In non-limiting embodiments or aspects, the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof. In non-limiting embodiments or aspects, modifying the captured image data comprises generating a copy of the captured image data and modifying the copy of the captured image data to form the modified image data.

According to non-limiting embodiments or aspects, provided is a method for training a machine-learning-based artificial intelligence (AI) model to handle diverse types of tissue appearances during medical imaging, comprising: capturing a series of training medical images using an imaging device, the series of training medical images comprising a plurality of frames in a sequence; generating, with a computing device, a set of control points around each frame and each classified object in each frame of at least a subset of frames of the plurality of frames; generating, with a computing device, a set of deformed control points for each frame of the at least a subset of frames with a convolutional neural network based on the set of control points and an uncertainty map; applying, with a computing device, geometric distortions to each frame of the at least a subset of frames based on the set of deformed control points to generate new training images; and training, with a computing device, a machine-learning-based AI model based on the new training images.

In non-limiting embodiments or aspects, the set of deformed control points is generated based on an affine transformation. In non-limiting embodiments or aspects, the set of deformed control points is generated by automatically assessing which portions of each frame of the at least a subset of frames satisfy an uncertainty threshold. In non-limiting embodiments or aspects, automatically assessing which portions of each frame of the at least a subset of frames satisfy the uncertainty threshold is based on an epistemic and/or aleatoric uncertainty map. In non-limiting embodiments or aspects, the epistemic and/or aleatoric uncertainty map is output from the machine-learning-based AI model being trained. In non-limiting embodiments or aspects, the machine-learning-based AI model being trained comprises a Bayesian artificial neural network. In non-limiting embodiments or aspects, the set of deformed control points is generated based on an output of a separate-agent adversarial-augmentation artificial neural network configured to process an output of the automated assessment as input.

According to non-limiting embodiments or aspects, provided is a method for training a machine-learning-based artificial intelligence (AI) model to handle diverse types of tissue appearances during medical imaging, comprising: capturing a series of training medical images using an imaging device; augmenting the training medical images into new training images, wherein differing distortions are targeted at different parts within individual frames of the series of training medical images and/or videos; applying distortions to each new training image of the new training images; and computing the distortions interactively during AI learning based on an automatic assessment of at least one of: which parts of a training image are less challenging to be visually understood by the AI in comparison to parts that are more challenging to be visually understood by the AI at that moment in training; and/or a degree to which the AI is challenged by each of different parts of a training image at that moment in training.

In non-limiting embodiments or aspects, the distortions are geometric and are applied using a Moving Least Squares Image Deformation. In non-limiting embodiments or aspects, the distortions are computed based on the output of a separate-agent adversarial-augmentation artificial neural network that processes, as input, an assessment of how challenging different image regions are. In non-limiting embodiments or aspects, an augmentation system augments training medical images into new training images, and the augmentation system is integrated with one or more data augmentation processes such that the augmentation system spot-augments specific regions of the image data during training.

According to non-limiting embodiments or aspects, provided is a system comprising at least one computing device programmed or configured to perform the method. According to non-limiting embodiments or aspects, provided is a computer program product comprising at least one non-transitory computer-readable medium including program instructions that, when executed by at least one computing device, cause the at least one computing device to perform the method.

According to non-limiting embodiments or aspects, provided is a system for training a machine-learning-based artificial intelligence (AI) model to handle diverse types of tissue appearances during medical imaging, comprising at least one computing device programmed or configured to: capture a series of training medical images using an imaging device, the series of training medical images comprising a plurality of frames in a sequence; generate a set of control points around each frame and each classified object in each frame of at least a subset of frames of the plurality of frames; generate a set of deformed control points for each frame of the at least a subset of frames with a convolutional neural network based on the set of control points and an uncertainty map; apply geometric distortions to each frame of the at least a subset of frames based on the set of deformed control points to generate new training images; and train a machine-learning-based AI model based on the new training images.

In non-limiting embodiments or aspects, the set of deformed control points is generated based on an affine transformation. In non-limiting embodiments or aspects, the set of deformed control points is generated by automatically assessing which portions of each frame of the at least a subset of frames satisfy an uncertainty threshold. In non-limiting embodiments or aspects, wherein automatically assessing which portions of each frame of the at least a subset of frames satisfy the uncertainty threshold is based on an epistemic and/or aleatoric uncertainty map. In non-limiting embodiments or aspects, the epistemic and/or aleatoric uncertainty map is output from the machine-learning-based AI model being trained. In non-limiting embodiments or aspects, the machine-learning-based AI model being trained comprises a Bayesian artificial neural network. In non-limiting embodiments or aspects, the set of deformed control points is generated based on an output of a separate-agent adversarial-augmentation artificial neural network configured to process the automated assessment as input.

According to non-limiting embodiments or aspects, provided is a computer program product for training a machine-learning-based artificial intelligence (AI) model to handle diverse types of tissue appearances during medical imaging, comprising at least one non-transitory computer-readable medium including program instructions that, when executed by at least one computing device, cause the at least one computing device to: capture a series of training medical images using an imaging device, the series of training medical images comprising a plurality of frames in a sequence; generate a set of control points around each frame and each classified object in each frame of at least a subset of frames of the plurality of frames; generate a set of deformed control points for each frame of the at least a subset of frames with a convolutional neural network based on the set of control points and an uncertainty map; apply geometric distortions to each frame of the at least a subset of frames based on the set of deformed control points to generate new training images; and train a machine-learning-based AI model based on the new training images. In non-limiting embodiments or aspects, the set of deformed control points is generated based on an affine transformation.

In non-limiting embodiments or aspects, the set of deformed control points is generated by automatically assessing which portions of each frame of the at least a subset of frames satisfy an uncertainty threshold. In non-limiting embodiments or aspects, automatically assessing which portions of each frame of the at least a subset of frames satisfy the uncertainty threshold is based on an epistemic and/or aleatoric uncertainty map. In non-limiting embodiments or aspects, the epistemic and/or aleatoric uncertainty map is output from the machine-learning-based AI model being trained. In non-limiting embodiments or aspects, the machine-learning-based AI model being trained comprises a Bayesian artificial neural network. In non-limiting embodiments or aspects, the set of deformed control points is generated based on an output of a separate-agent adversarial-augmentation artificial neural network configured to process an output of the automated assessment as input.

According to non-limiting embodiments or aspects, provided is a system for training a machine-learning-based artificial intelligence (AI) model to handle diverse types and/or appearances of tissue during medical imaging by acquiring new training data during training, comprising: a robot configured to autonomously acquire training image data of a subject; at least one computing device in communication with the robot, the at least one computing device configured to: assess an image quality of the training image data in real-time as the training image data is acquired by the robot; create at least one map of the training image data based on the image quality of the training image data; and coordinate acquisition of new training image data by the robot based on the at least one map of the training image data.

In non-limiting embodiments or aspects, assessing the image quality comprises determining a mean estimate and an uncertainty estimate of the mean estimate. In non-limiting embodiments or aspects, determining the mean estimate and the uncertainty estimate is based on a Gaussian process or co-variance model. In non-limiting embodiments or aspects, wherein coordinating acquisition of new training image data comprises optimizing at least one of the following image quality parameters: highest mean, upper confidence bound, expected improvement, or any combination thereof. In non-limiting embodiments or aspects, the at least one computing device is further configured to determine the mean estimate and the uncertainty estimate based on a combination of epistemic and aleatoric uncertainty outputs from a Bayesian AI model being trained. In non-limiting embodiments or aspects, wherein tissue is autonomously physically manipulated by the robot or a second device to change an appearance of images being captured while acquiring the training image data. In non-limiting embodiments or aspects, the at least one computing device is further configured to train a machine-learning-based AI model based on the new training image data, and the robot or the second device is configured to manipulate the tissue during run-time usage of the machine-learning-based AI model. In non-limiting embodiments or aspects, the tissue is physically manipulated to appear as tissue captured in the new training image data. In non-limiting embodiments or aspects, the at least one computing device is further configured to incrementally change one or more aspects of the training image data to improve the image quality. In non-limiting embodiments or aspects, the at least one computing device comprises a first AI system and a second AI system, the first AI system comprises a student AI system, and the second AI system comprises a teacher AI system configured to coordinate the student AI system based on an intended course of action. In non-limiting embodiments or aspects, the training image data is represented in a latent space of independent vectors, wherein each latent vector represents a single aspect of change in the training image data, and the acquisition of the new training image data or an augmentation of the training image data is based on the latent vector representation. In non-limiting embodiments or aspects, the at least one computing device is further configured to create or infer the independent latent vectors based on disentangled data representations. In non-limiting embodiments or aspects, the training image data comprise at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and the at least one computing device comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosting machine, a gradient boosted regression tree, or any combination thereof. In non-limiting embodiments or aspects, the at least one computing device comprises a first AI system and a second AI system, the first AI system is configured to assess the image quality of the training image data in real-time as it is being acquired by the robot and create the at least one map of the training image data based on the image quality of the training image data, and the second AI system is configured to coordinate acquisition of the new training image data based on the at least one map of the training image data.

According to non-limiting embodiments or aspects, provided is a method for training a machine-learning-based artificial intelligence (AI) model to handle diverse types and/or appearances of tissue during medical imaging by acquiring new training data during training, comprising: autonomously acquiring, with a computing device, training image data of a subject with a robot; assessing, with a computing device, an image quality of the training image data in real-time as the training image data is acquired by the robot; creating, with a computing device, at least one map of the training image data based on the image quality of the training image data; and coordinating, with a computing device, acquisition of new training image data by the robot based on the at least one map of the training image data.

In non-limiting embodiments or aspects, assessing the image quality comprises determining a mean estimate and an uncertainty estimate of the mean estimate. In non-limiting embodiments or aspects, wherein determining the mean estimate and the uncertainty estimate is based on a Gaussian process or co-variance model. In non-limiting embodiments or aspects, coordinating acquisition of new training image data comprises optimizing at least one of the following image quality parameters: highest mean, upper confidence bound, expected improvement, or any combination thereof. In non-limiting embodiments or aspects, the method further comprises determining the mean estimate and the uncertainty estimate based on a combination of epistemic and aleatoric uncertainty outputs from a Bayesian AI model being trained. In non-limiting embodiments or aspects, tissue is autonomously physically manipulated by the robot or a second device to change an appearance of images being captured while acquiring the training image data. In non-limiting embodiments or aspects, the method further comprises training a machine-learning-based AI model based on the new training image data, and the robot or the second device is configured to manipulate the tissue during run-time usage of the machine-learning-based AI model. In non-limiting embodiments or aspects, the tissue is physically manipulated to appear as tissue captured in the new training image data. In non-limiting embodiments or aspects, the method further comprising incrementally changing one or more aspects of the training image data to improve the image quality. In non-limiting embodiments or aspects, the training image data is represented in a latent space of independent vectors, wherein each latent vector represents a single aspect of change in the training image data, and the acquisition of the new training image data or an augmentation of the training image data is based on the latent vector representation. In non-limiting embodiments or aspects, the at least one computing device is further configured to create or infer the independent latent vectors based on disentangled data representations. In non-limiting embodiments or aspects, the training image data comprise at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and the computing device comprises at least one of the following: a convolutional neural network, a recurrent neural network, a long-short-term-memory neural network, a Bayesian network, a Bayesian neural network, a transformer network, an auto-encoder network, deep Boltzmann machine, deep belief network, random forest, Bayesian random forest, a gradient boosting machine, a gradient boosted regression tree, or any combination thereof.

According to non-limiting embodiments or aspects, provided is a computer program product for training a machine-learning-based artificial intelligence (AI) model to handle diverse types and/or appearances of tissue during medical imaging by acquiring new training data during training, comprising at least one non-transitory computer-readable medium including program instructions that, when executed by at least one computing device, cause the at least one computing device to: autonomously acquire training image data of a subject with a robot; assess an image quality of the training image data in real-time as the training image data is acquired by the robot; create at least one map of the training image data based on the image quality of the training image data; and coordinate acquisition of new training image data by the robot based on the at least one map of the training image data.

In non-limiting embodiments or aspects, assessing the image quality comprises determining a mean estimate and an uncertainty estimate of the mean estimate. In non-limiting embodiments or aspects, determining the mean estimate and the uncertainty estimate is based on a Gaussian process or co-variance model. In non-limiting embodiments or aspects, coordinating the acquisition of new training image data comprises optimizing at least one of the following image quality parameters: highest mean, upper confidence bound, expected improvement, or any combination thereof. In non-limiting embodiments or aspects, the program instructions further cause the at least one computing device to determine the mean estimate and the uncertainty estimate based on a combination of epistemic and aleatoric uncertainty outputs from a Bayesian AI model being trained.

In non-limiting embodiments or aspects, tissue is autonomously physically manipulated by the robot or a second device to change an appearance of images being captured while acquiring the training image data. In non-limiting embodiments or aspects, the program instructions further cause the at least one computing device to train a machine-learning-based AI model based on the new training image data, and the robot or the second device is configured to manipulate the tissue during run-time usage of the machine-learning-based AI model. In non-limiting embodiments or aspects, the tissue is physically manipulated to appear as tissue captured in the new training image data. In non-limiting embodiments or aspects, the program instructions further cause the at least one computing device to incrementally change one or more aspects of the training image data to improve the image quality. In non-limiting embodiments or aspects, the training image data is represented in a latent space of independent vectors, wherein each latent vector represents a single aspect of change in the training image data, and the acquisition of the new training image data or an augmentation of the training image data is based on the latent vector representation. In non-limiting embodiments or aspects, the program instructions further cause the at least one computing device to create or infer the independent latent vectors based on disentangled data representations. In non-limiting embodiments or aspects, the training image data comprise at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multi-spectral images, tomographic images, projection images, integration images, reconstructed images, or any combination thereof, and the at least one computing device comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosting machine, a gradient boosted regression tree, or any combination thereof.

According to non-limiting embodiments or aspects, provided is a method of training a machine-learning-based artificial intelligence (AI) model to handle diverse types of changes occurring during image acquisition, comprising: capturing image data using an imaging device to result in a plurality of frames of captured image data, the captured image data comprising motion between the imaging device and the tissue; determining at least one latent vector representation; inputting the at least one latent vector representation and the captured image data into a variational autoencoder model; decoding, with the variational autoencoder model, the at least one latent vector representation and the captured image data into adversary image data; and training a machine-learning-based AI model based on the adversary image data. In non-limiting embodiments or aspects, each vector dimension of the latent vector representation represents a single degree of change of a target domain. In non-limiting embodiments or aspects, wherein each latent vector representation is independent of each other latent vector representations.

According to non-limiting embodiments or aspects, provided is a system to train a machine-learning-based artificial intelligence (AI) model to handle diverse types of changes occurring during image acquisition, comprising at least one computing device programmed or configured to: capture image data using an imaging device to result in a plurality of frames of captured image data, the captured image data comprising motion between the imaging device and tissue; determine at least one latent vector representation; input the at least one latent vector representation and the captured image data into a variational autoencoder model; decode, with the variational autoencoder model, the at least one latent vector representation and the captured image data into adversary image data; and train a machine-learning-based AI model based on the adversary image data. In non-limiting embodiments or aspects, each vector dimension of the latent vector representation represents a single degree of change of a target domain. In non-limiting embodiments or aspects, each latent vector representation is independent of each other latent vector representations.

According to non-limiting embodiments or aspects, provided is a computer program product to train a machine-learning-based artificial intelligence (AI) model to handle diverse types of changes occurring during image acquisition, comprising at least one non-transitory computer-readable medium including program instructions that, when executed by at least one computing device, cause the at least one computing device to: capture image data using an imaging device to result in a plurality of frames of captured image data, the captured image data comprising motion between the imaging device and the tissue; determine at least one latent vector representation; input the at least one latent vector representation and the captured image data into a variational autoencoder model; decode, with the variational autoencoder model, the at least one latent vector representation and the captured image data into adversary image data; and train a machine-learning-based AI model based on the adversary image data. In non-limiting embodiments or aspects, wherein each vector dimension of the latent vector representation represents a single degree of change of a target domain. In non-limiting embodiments or aspects, wherein each latent vector representation is independent of each other latent vector representations.

Further embodiments or aspects are set forth in the following numbered clauses:

Clause 1: A method of training a machine-learning-based artificial intelligence (AI) model to handle diverse types of motions occurring during image acquisition, comprising: capturing image data using an imaging device to result in a plurality of frames of captured image data, the captured image data comprising motion between the imaging device and the tissue; modifying, with a computing device, the captured image data, resulting in modified image data, by at least one of: altering an amount of time between any two frames of the captured image data; removing a subsequence of frames from the captured image data; and adding a subsequence of one or more new frames to the captured image data, each of the one or more new frames comprising at least one of: a copy of at least one frame of the captured image data, a composite frame created from other frames in the captured image data, an interpolated frame generated to appear between other frames in the captured image data, a frame that is not included in the captured image data, or any combination thereof; and training, with a computing device, a machine-learning-based AI model based on the modified image data.

Clause 2: The method of clause 1, wherein the image data is captured in real-time or was previously captured.

Clause 3: The method of clauses 1 or 2, wherein modifying the captured image data comprises removing a subsequence of frames from the captured image data, the method further comprising: determining a probability value for each frame of the captured image data; and determining the subsequence of frames of the captured image data by comparing the probability value of each frame to a predetermined probability threshold value.

Clause 4: The method of any of clauses 1-3, wherein modifying the captured image data comprises removing a subsequence of frames from the captured image data, the method further comprising: selecting a range of frames from the captured image data; generating a random integer having a value greater than or equal to a first frame number of the range of frames and less than or equal to one greater than a final frame of the range of frames; and determining a selected frame for the subsequence of frames based on the random integer.

Clause 5: The method of any of clauses 1-4, wherein modifying the captured image data comprises adding a subsequence of one or more new frames to the captured image data, the method further comprising: randomly generating a temporal shift of a predetermined length; splitting the captured image data into a plurality of subsequences equaling the predetermined length; generating a random integer for each subsequence of the plurality of subsequences; and spatially shifting at least one of a width and height of at least one frame of each subsequence of the plurality of subsequences based on the random integer corresponding to the subsequence.

Clause 6: The method of any of clauses 1-5, wherein the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multi-spectral images, tomographic images, projection images, integration images, reconstructed images, or any combination thereof, and wherein the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof.

Clause 7: A system for training a machine-learning-based artificial intelligence (AI) to handle diverse types of motions occurring during video acquisition, comprising at least one computing device programmed or configured to: capture image data using an imaging device to result in a plurality of frames of captured image data, the captured image data comprising motion between the imaging device and tissue; modify the captured image data, resulting in modified image data, by at least one of: alter an amount of time between any two images of the captured image data; remove a subsequence of frames from the captured image data; and add a subsequence of one or more new frames to the captured image data, each of the one or more new frames comprising at least one of: a copy of at least one frame of the captured image data, a composite frame created from other frames in the captured image data, an interpolated frame generated to appear to have been between other frames in the captured image data, a frame that is not included in the captured image data, or any combination thereof; and train a machine-learning-based AI model based on the modified image data Clause 8: The system of clause 7, wherein the image data is captured in real-time or was previously captured.

Clause 9: The system of clauses 7 or 8, wherein modifying the captured image data comprises removing a subsequence of frames from the captured image data, the at least one computing device further configured to: determine a probability value for each frame of the captured image data; and determine the subsequence of frames of the image data by comparing the probability value of each frame to a predetermined probability threshold value.

Clause 10: The system of any of clauses 7-9, wherein modifying the captured image data comprises removing a subsequence of frames from the captured image data, the at least one computing device further configured to: select a range of frames from the captured image data; generate a random integer having a value greater than or equal to a first frame number of the range of frames and less than or equal to one greater than a final frame of the range of frames; and determine a selected frame for the subsequence of frames based on the random integer.

Clause 11: The system of any of clauses 7-10, wherein modifying the captured image data comprises adding a subsequence of one or more new frames to the captured image data, the at least one computing device further configured to: randomly generate a temporal shift magnitude of a predetermined length; split the captured image data into a plurality of subsequences equaling the predetermined length; generate a random integer for each subsequence of the plurality of subsequences; and spatially shift at least one of a width and height of at least one frame of each subsequence of the plurality of subsequences based on the random integer corresponding to the subsequence.

Clause 12: The system of any of clauses 7-11, wherein the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multi-spectral images, tomographic images, projection images, integration images, reconstructed images, or any combination thereof, and wherein the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof.

Clause 13: A computer program product for training a machine-learning-based artificial intelligence (AI) to handle diverse types of motions occurring during video acquisition, comprising at least one non-transitory computer-readable medium including program instructions that, when executed by at least one computing device, cause the at least one computing device to: capture image data using an imaging device to result in a plurality of frames of captured image data, the captured image data comprising motion between the imaging device and tissue; modify the captured image data, resulting in modified image data, by at least one of: alter an amount of time between any two images of the captured image data; remove a subsequence of frames from the captured image data; and add a subsequence of one or more new frames to the captured image data, each of the one or more new frames comprising at least one of: a copy of at least one frame of the captured image data, a composite frame created from other frames in the captured image data, an interpolated frame generated to appear to have been between other frames in the captured image data, a frame that is not included in the captured image data, or any combination thereof; and train a machine-learning-based AI model based on the modified image data.

Clause 14: The computer program product of clause 13, wherein the image data is captured in real-time or was previously captured.

Clause 15: The computer program product of clauses 13 or 14, wherein modifying the captured image data comprises removing a subsequence of frames from the captured image data, the program instructions further causing the at least one computing device to: determine a probability value for each frame of the captured image data; and determine the subsequence of frames of the image data by comparing the probability value of each frame to a predetermined probability threshold value.

Clause 16: The computer program product of any of clauses 13-15, wherein modifying the captured image data comprises removing a subsequence of frames from the captured image data, the program instructions further causing the at least one computing device to: select a range of frames from the captured image data; generate a random integer having a value greater than or equal to a first frame number of the range of frames and less than or equal to one greater than a final frame of the range of frames; and determine a selected frame for the subsequence of frames based on the random integer.

Clause 17: The computer program product of any of clauses 13-16, wherein modifying the captured image data comprises adding a subsequence of one or more new frames to the captured image data, the program instructions further causing the at least one computing device to: randomly generate a temporal shift magnitude for each subsequence of frames of a predetermined length; split the captured image data into a plurality of subsequences equaling the predetermined length; generate a random integer for each subsequence of the plurality of subsequences; and spatially shift at least one of a width and height of at least one frame of each subsequence of the plurality of subsequences based on the random integer corresponding to the subsequence.

Clause 18: The computer program product of any of clauses 13-17, wherein the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof.

Clause 19: The method of any of clauses 1-6, wherein modifying the captured image data comprises generating a copy of the captured image data and modifying the copy of the captured image data to form the modified image data.

Clause 20: A method for training a machine-learning-based artificial intelligence (AI) model to handle diverse types of tissue appearances during medical imaging, comprising: capturing a series of training medical images using an imaging device, the series of training medical images comprising a plurality of frames in a sequence; generating, with a computing device, a set of control points around each frame and each classified object in each frame of at least a subset of frames of the plurality of frames; generating, with a computing device, a set of deformed control points for each frame of the at least a subset of frames with a convolutional neural network based on the set of control points and an uncertainty map; applying, with a computing device, geometric distortions to each frame of the at least a subset of frames based on the set of deformed control points to generate new training images; and training, with a computing device, a machine-learning-based AI model based on the new training images.

Clause 21: The method of clause 20, wherein the set of deformed control points is generated based on an affine transformation.

Clause 22: The method of clauses 20 or 21, wherein the set of deformed control points is generated by automatically assessing which portions of each frame of the at least a subset of frames satisfy an uncertainty threshold.

Clause 23: The method of any of clauses 20-22, wherein automatically assessing which portions of each frame of the at least a subset of frames satisfy the uncertainty threshold is based on an epistemic and/or aleatoric uncertainty map.

Clause 24: The method of any of clauses 20-23, wherein the epistemic and/or aleatoric uncertainty map is output from the machine-learning-based AI model being trained.

Clause 25: The method of any of clauses 20-24, wherein the machine-learning-based AI model being trained comprises a Bayesian artificial neural network.

Clause 26: The method of any of clauses 20-25, wherein the set of deformed control points is generated based on an output of a separate-agent adversarial-augmentation artificial neural network configured to process an output of the automated assessment as input.

Clause 27: A method for training a machine-learning-based artificial intelligence (AI) model to handle diverse types of tissue appearances during medical imaging, comprising: capturing a series of training medical images using an imaging device; augmenting the training medical images into new training images, wherein differing distortions are targeted at different parts within individual frames of the series of training medical images and/or videos; applying distortions to each new training image of the new training images; and computing the distortions interactively during AI learning based on an automatic assessment of at least one of: which parts of a training image are less challenging to be visually understood by the AI in comparison to parts that are more challenging to be visually understood by the AI at that moment in training; and/or a degree to which the AI is challenged by each of different parts of a training image at that moment in training.

Clause 28: The method of clause 27, wherein the distortions are geometric and are applied using a Moving Least Squares Image Deformation.

Clause 29: The method of clauses 27 or 28, wherein the distortions are computed based on the output of a separate-agent adversarial-augmentation artificial neural network that processes, as input, an assessment of how challenging different image regions are.

Clause 30: The method of any of clauses 27-29, wherein an augmentation system augments training medical images into new training images, and wherein the augmentation system is integrated with one or more data augmentation processes such that the augmentation system spot-augments specific regions of the image data during training.

Clause 31: A system comprising at least one computing device programmed or configured to perform the method of any of clauses 27-30.

Clause 32: A computer program product comprising at least one non-transitory computer-readable medium including program instructions that, when executed by at least one computing device, cause the at least one computing device to perform the method of any of clauses 27-30.

Clause 33: A system for training a machine-learning-based artificial intelligence (AI) model to handle diverse types of tissue appearances during medical imaging, comprising at least one computing device programmed or configured to: capture a series of training medical images using an imaging device, the series of training medical images comprising a plurality of frames in a sequence; generate a set of control points around each frame and each classified object in each frame of at least a subset of frames of the plurality of frames; generate a set of deformed control points for each frame of the at least a subset of frames with a convolutional neural network based on the set of control points and an uncertainty map; apply geometric distortions to each frame of the at least a subset of frames based on the set of deformed control points to generate new training images; and train a machine-learning-based AI model based on the new training images.

Clause 34: The system of clause 33, wherein the set of deformed control points is generated based on an affine transformation.

Clause 35: The system of clauses 33 or 34, wherein the set of deformed control points is generated by automatically assessing which portions of each frame of the at least a subset of frames satisfy an uncertainty threshold.

Clause 36: The system of any of clauses 33-35, wherein automatically assessing which portions of each frame of the at least a subset of frames satisfy the uncertainty threshold is based on an epistemic and/or aleatoric uncertainty map.

Clause 37: The system of any of clauses 33-36, wherein the epistemic and/or aleatoric uncertainty map is output from the machine-learning-based AI model being trained.

Clause 38: The system of any of clauses 33-37, wherein the machine-learning-based AI model being trained comprises a Bayesian artificial neural network.

Clause 39: The system of any of clauses 33-38, wherein the set of deformed control points is generated based on an output of a separate-agent adversarial-augmentation artificial neural network configured to process the automated assessment as input.

Clause 40: A computer program product for training a machine-learning-based artificial intelligence (AI) model to handle diverse types of tissue appearances during medical imaging, comprising at least one non-transitory computer-readable medium including program instructions that, when executed by at least one computing device, cause the at least one computing device to: capture a series of training medical images using an imaging device, the series of training medical images comprising a plurality of frames in a sequence; generate a set of control points around each frame and each classified object in each frame of at least a subset of frames of the plurality of frames; generate a set of deformed control points for each frame of the at least a subset of frames with a convolutional neural network based on the set of control points and an uncertainty map; apply geometric distortions to each frame of the at least a subset of frames based on the set of deformed control points to generate new training images; and train a machine-learning-based AI model based on the new training images.

Clause 41: The computer program product of clause 40, wherein the set of deformed control points is generated based on an affine transformation.

Clause 42: The computer program product of clauses 40 or 41, wherein the set of deformed control points is generated by automatically assessing which portions of each frame of the at least a subset of frames satisfy an uncertainty threshold.

Clause 43: The computer program product of any of clauses 40-42, wherein automatically assessing which portions of each frame of the at least a subset of frames satisfy the uncertainty threshold is based on an epistemic and/or aleatoric uncertainty map.

Clause 44: The computer program product of any of clauses 40-43, wherein the epistemic and/or aleatoric uncertainty map is output from the machine-learning-based AI model being trained.

Clause 45: The computer program product of any of clauses 40-44, wherein the machine-learning-based AI model being trained comprises a Bayesian artificial neural network.

Clause 46: The computer program product of any of clauses 40-45, wherein the set of deformed control points is generated based on an output of a separate-agent adversarial-augmentation artificial neural network configured to process an output of the automated assessment as input.

Clause 47: A system for training a machine-learning-based artificial intelligence (AI) model to handle diverse types and/or appearances of tissue during medical imaging by acquiring new training data during training, comprising: a robot configured to autonomously acquire training image data of a subject; at least one computing device in communication with the robot, the at least one computing device configured to: assess an image quality of the training image data in real-time as the training image data is acquired by the robot; create at least one map of the training image data based on the image quality of the training image data; and coordinate acquisition of new training image data by the robot based on the at least one map of the training image data.

Clause 48: The system of clause 47, wherein assessing the image quality comprises determining a mean estimate and an uncertainty estimate of the mean estimate.

Clause 49: The system of clauses 47 or 48, wherein determining the mean estimate and the uncertainty estimate is based on a Gaussian process or co-variance model.

Clause 50: The system of any of clauses 47-49, wherein coordinating acquisition of new training image data comprises optimizing at least one of the following image quality parameters: highest mean, upper confidence bound, expected improvement, or any combination thereof.

Clause 51: The system of any of clauses 47-50, wherein the at least one computing device is further configured to determine the mean estimate and the uncertainty estimate based on a combination of epistemic and aleatoric uncertainty outputs from a Bayesian AI model being trained.

Clause 52: The system of any of clauses 47-51, wherein tissue is autonomously physically manipulated by the robot or a second device to change an appearance of images being captured while acquiring the training image data.

Clause 53: The system of any of clauses 47-52, wherein the at least one computing device is further configured to train a machine-learning-based AI model based on the new training image data, and wherein the robot or the second device is configured to manipulate the tissue during run-time usage of the machine-learning-based AI model.

Clause 54: The system of any of clauses 47-53, wherein the tissue is physically manipulated to appear as tissue captured in the new training image data.

Clause 55: The system of any of clauses 47-54, wherein the at least one computing device is further configured to incrementally change one or more aspects of the training image data to improve the image quality.

Clause 56: The system of any of clauses 47-55, wherein the at least one computing device comprises a first AI system and a second AI system, wherein the first AI system comprises a student AI system, and wherein the second AI system comprises a teacher AI system configured to coordinate the student AI system based on an intended course of action.

Clause 57: The system of any of clauses 47-56, wherein the training image data is represented in a latent space of independent vectors, wherein each latent vector represents a single aspect of change in the training image data, and wherein the acquisition of the new training image data or an augmentation of the training image data is based on the latent vector representation.

Clause 58: The system of any of clauses 47-57, wherein the at least one computing device is further configured to create or infer the independent latent vectors based on disentangled data representations.

Clause 59: The system of any of clauses 47-58, wherein the training image data comprise at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the at least one computing device comprises at least one of the following: a convolutional neural network, a recurrent neural network, a long-short-term-memory neural network, a Bayesian network, a Bayesian neural network, a transformer network, an autoencoder network, a deep Boltzmann machine, a deep belief network, a random forest, a Bayesian random forest, a gradient boosting machine, a gradient boosted regression tree, or any combination thereof.

Clause 60: The system of any of clauses 47-59, wherein the at least one computing device comprises a first AI system and a second AI system, wherein the first AI system is configured to assess the image quality of the training image data in real-time as it is being acquired by the robot and create the at least one map of the training image data based on the image quality of the training image data, and wherein the second AI system is configured to coordinate acquisition of the new training image data based on the at least one map of the training image data.

Clause 61: A method for training a machine-learning-based artificial intelligence (AI) model to handle diverse types and/or appearances of tissue during medical imaging by acquiring new training data during training, comprising: autonomously acquiring, with a computing device, training image data of a subject with a robot; assessing, with a computing device, an image quality of the training image data in real-time as the training image data is acquired by the robot; creating, with a computing device, at least one map of the training image data based on the image quality of the training image data; and coordinating, with a computing device, acquisition of new training image data by the robot based on the at least one map of the training image data.

Clause 62: The method of clause 61, wherein assessing the image quality comprises determining a mean estimate and an uncertainty estimate of the mean estimate.

Clause 63: The method of clauses 61 or 62, wherein determining the mean estimate and the uncertainty estimate is based on a Gaussian process or co-variance model.

Clause 64: The method of any of clauses 61-63, wherein coordinating acquisition of new training image data comprises optimizing at least one of the following image quality parameters: highest mean, upper confidence bound, expected improvement, or any combination thereof.

Clause 65: The method of any of clauses 61-64, further comprising determining the mean estimate and the uncertainty estimate based on a combination of epistemic and aleatoric uncertainty outputs from a Bayesian AI model being trained.

Clause 66: The method of any of clauses 61-65, wherein tissue is autonomously physically manipulated by the robot or a second device to change an appearance of images being captured while acquiring the training image data.

Clause 67: The method of any of clauses 61-66, further comprising training a machine-learning-based AI model based on the new training image data, and wherein the robot or the second device is configured to manipulate the tissue during run-time usage of the machine-learning-based AI model.

Clause 68: The method of any of clauses 61-67, wherein the tissue is physically manipulated to appear as tissue captured in the new training image data.

Clause 69: The method of any of clauses 61-68, further comprising incrementally changing one or more aspects of the training image data to improve the image quality.

Clause 70: The method of any of clauses 61-69, wherein the training image data is represented in a latent space of independent vectors, wherein each latent vector represents a single aspect of change in the training image data, and wherein the acquisition of the new training image data or an augmentation of the training image data is based on the latent vector representation.

Clause 71: The method of any of clauses 61-70, wherein the at least one computing device is further configured to create or infer the independent latent vectors based on disentangled data representations.

Clause 72: The method of any of clauses 61-71, wherein the training image data comprise at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the computing device comprises at least one of the following: a convolutional neural network, a recurrent neural network, a long-short-term-memory neural network, a Bayesian network, a Bayesian neural network, a transformer network, an auto-encoder network, deep Boltzmann machine, deep belief network, random forest, Bayesian random forest, a gradient boosting machine, a gradient boosted regression tree, or any combination thereof.

Clause 73: A computer program product for training a machine-learning-based artificial intelligence (AI) model to handle diverse types and/or appearances of tissue during medical imaging by acquiring new training data during training, comprising at least one non-transitory computer-readable medium including program instructions that, when executed by at least one computing device, cause the at least one computing device to: autonomously acquire training image data of a subject with a robot; assess an image quality of the training image data in real-time as the training image data is acquired by the robot; create at least one map of the training image data based on the image quality of the training image data; and coordinate acquisition of new training image data by the robot based on the at least one map of the training image data.

Clause 74: The computer program product of clause 73, wherein assessing the image quality comprises determining a mean estimate and an uncertainty estimate of the mean estimate.

Clause 75: The computer program product of clauses 73 or 74, wherein determining the mean estimate and the uncertainty estimate is based on a Gaussian process or co-variance model.

Clause 76: The computer program product of any of clauses 73-75, wherein coordinating the acquisition of new training image data comprises optimizing at least one of the following image quality parameters: highest mean, upper confidence bound, expected improvement, or any combination thereof.

Clause 77: The computer program product of any of clauses 73-76, wherein the program instructions further cause the at least one computing device to determine the mean estimate and the uncertainty estimate based on a combination of epistemic and aleatoric uncertainty outputs from a Bayesian AI model being trained.

Clause 78: The computer program product of any of clauses 73-77, wherein tissue is autonomously physically manipulated by the robot or a second device to change an appearance of images being captured while acquiring the training image data.

Clause 79: The computer program product of any of clauses 73-78, wherein the program instructions further cause the at least one computing device to train a machine-learning-based AI model based on the new training image data, and wherein the robot or the second device is configured to manipulate the tissue during run-time usage of the machine-learning-based AI model.

Clause 80: The computer program product of any of clauses 73-79, wherein the tissue is physically manipulated to appear as tissue captured in the new training image data.

Clause 81: The computer program product of any of clauses 73-80, wherein the program instructions further cause the at least one computing device to incrementally change one or more aspects of the training image data to improve the image quality.

Clause 82: The computer program product of any of clauses 73-81, wherein the training image data is represented in a latent space of independent vectors, wherein each latent vector represents a single aspect of change in the training image data, and wherein the acquisition of the new training image data or an augmentation of the training image data is based on the latent vector representation.

Clause 83: The computer program product of any of clauses 73-82, wherein the program instructions further cause the at least one computing device to create or infer the independent latent vectors based on disentangled data representations.

Clause 84: The computer program product of any of clauses 73-83, wherein the training image data comprise at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the at least one computing device comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosting machine, a gradient boosted regression tree, or any combination thereof.

Clause 85: A method of training a machine-learning-based artificial intelligence (AI) model to handle diverse types of changes occurring during image acquisition, comprising: capturing image data using an imaging device to result in a plurality of frames of captured image data, the captured image data comprising motion between the imaging device and the tissue; determining at least one latent vector representation; inputting the at least one latent vector representation and the captured image data into a variational autoencoder model; decoding, with the variational autoencoder model, the at least one latent vector representation and the captured image data into adversary image data; and training a machine-learning-based AI model based on the adversary image data.

Clause 86: The method of clause 85, wherein each vector dimension of the latent vector representation represents a single degree of change of a target domain.

Clause 87: The method of any of clauses 85-86, wherein each latent vector representation is independent of each other latent vector representations.

Clause 88: A system to train a machine-learning-based artificial intelligence (AI) model to handle diverse types of changes occurring during image acquisition, comprising at least one computing device programmed or configured to: capture image data using an imaging device to result in a plurality of frames of captured image data, the captured image data comprising motion between the imaging device and tissue; determine at least one latent vector representation; input the at least one latent vector representation and the captured image data into a variational autoencoder model; decode, with the variational autoencoder model, the at least one latent vector representation and the captured image data into adversary image data; and train a machine-learning-based AI model based on the adversary image data.

Clause 89: The system of clause 88, wherein each vector dimension of the latent vector representation represents a single degree of change of a target domain.

Clause 90: The system of clauses 88 or 89, wherein each latent vector representation is independent of each other latent vector representations.

Clause 91: A computer program product to train a machine-learning-based artificial intelligence (AI) model to handle diverse types of changes occurring during image acquisition, comprising at least one non-transitory computer-readable medium including program instructions that, when executed by at least one computing device, cause the at least one computing device to: capture image data using an imaging device to result in a plurality of frames of captured image data, the captured image data comprising motion between the imaging device and the tissue; determine at least one latent vector representation; input the at least one latent vector representation and the captured image data into a variational autoencoder model; decode, with the variational autoencoder model, the at least one latent vector representation and the captured image data into adversary image data; and train a machine-learning-based AI model based on the adversary image data.

Clause 92: The computer program product of clause 91, wherein each vector dimension of the latent vector representation represents a single degree of change of a target domain.

Clause 93: The computer program product of clauses 91 or 92, wherein each latent vector representation is independent of each other latent vector representations These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

Figure 1:
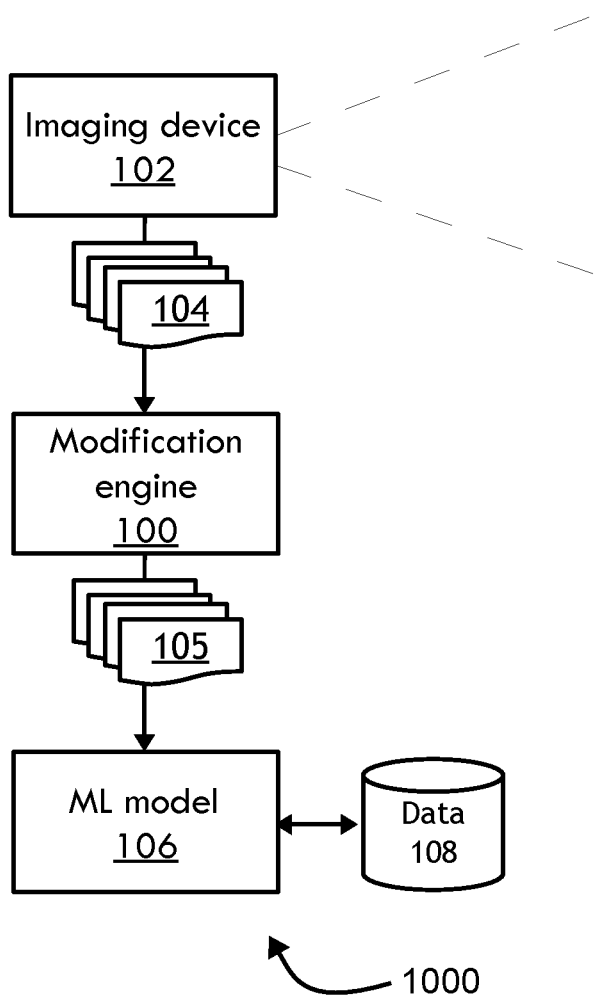
FIG. 1 illustrates a system for training a machine-learning-based artificial intelligence (AI) model according to non-limiting embodiments or aspects.

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a central processing unit (CPU), graphics processing unit (GPU), or the like. A computing device may be a mobile device. A computing device may also be a desktop computer or other form of non-mobile computer. In non-limiting embodiments or aspects, a computing device may include an AI accelerator, including an application-specific integrated circuit (ASIC) neural engine such as Apple's "Neural Engine" or Google's Tensor processing unit. In non-limiting embodiments or aspects, a computing device may be comprised of a plurality of individual circuits representing each connection in a neural network such that each circuit is configured to weigh inputs from each node in a neural network. In such an arrangement, logic gates and/or analog circuitry may be used without needing software, a processor, or memory.

Non-limiting embodiments or aspects provide for a system and method for training a machine-learning-based artificial intelligence (AI) model using ultrasound image data.

In non-limiting embodiments or aspects, image segmentation and data modification methodologies are used to randomly modify (e.g., augment, change, edit, distort, and/or the like) medical images, such as but not limited to ultrasound images, and train deep learning models (e.g., a convolutional neural network (CNN), Bayesian neural network (BNN), and/or the like) to generalize to various domains across images using the modified images as training data. Non-limiting embodiments may allow AI models to actively learn sequential feature invariances and features generated by different scanning procedures such that AI models may be capable of generalizing features captured in non-training or real-world scenarios. Addressing temporal features such as rapid and erratic vessel pulsations and ultrasound scanning methods during emergency scenarios using AI models has proved challenging.

Non-limiting embodiments or aspects provide for the modification of medical images through a stochastic temporal data augmentation, where the modified images may be used to train an AI model for generalization across various domains of medical images. In some non-limiting embodiments or aspects, stochastic temporal data augmentation may include stochastically dropping frames within each sequence of captured image data. For example, captured image data frames may each be assigned a probability value and frames may be dropped if the frame's assigned probability value meets or surpasses a threshold probability value. Non-limiting embodiments or aspects may modify image data by modifying captured image data by altering the amount of time between any two frames of captured image data. Non-limiting embodiments or aspects may modify medical image data by modifying captured image data by removing a subsequence of frames from the captured image data and creating a generated image sequence that may be used for training. In some non-limiting embodiments or aspects, subsequences of image data may be generated by stochastically dropping every other frame or randomly selected frames. For example, a sequence of training image data may be generated by selecting random frames from a captured image data sequence and combining the selected frames into a new sequence. Non-limiting embodiments or aspects may modify image data by adding a subsequence of one or more new frames to the sequence of captured image data. In some non-limiting embodiments or aspects, the new frames may include a copy of at least one frame of the captured image data, a composite frame created from other frames in the captured image data, an interpolated frame generated to appear to have been between other frames, a frame that is not included in the original captured image data, or any combination of such frames. Non-limiting embodiments or aspects may divide a captured image sequence into multiple subsequences where each subsequence may have a different magnitude of spatial and/or temporal shifts applied to the frames within the sequence. As such, non-limiting embodiments or aspects provide for synthetically instilling motion into existing image data across spatial-temporal differences between ultrasound imaging frames.

Non-limiting embodiments or aspects may adaptively generate spatial deformations to challenge an AI model in areas of the model's strengths and/or weaknesses. Non-limiting embodiments or aspects may use a dropout-based Bayesian formulation of a 3D U-Net encoder-decoder architecture. In some non-limiting embodiments or aspects, in order to determine a model's strengths and/or weaknesses within an image or sequence of image data, a Bayesian temporal segmentation network (BTSN) or other BNN may be used to generate uncertainty maps. For example, a BNN may be used to output an epistemic uncertainty map. In some non-limiting embodiments or aspects, a BTSN or BNN may output image segmentations. In some non-limiting embodiments or aspects, uncertainty maps may be input into another artificial neural network (ANN) to adversarially generate geometrically distorted images. The ANN may use methods such as Moving Least Squares Image Deformation to spatially deform and/or distort existing images and generate images with one or more regions of geometric compression, expansion, twist, shear, displacement, and/or other geometric distortion images. Non-limiting embodiments or aspects may use a CNN or other neural network to generate synthetic and/or modified images including image deformations for training. Non-limiting embodiments may integrate the adaptive generation of spatial deformations with other data modification techniques. Adaptive generation of spatial deformations described may occur in real-time or may be applied to previously captured image sequences. As such, non-limiting embodiments or aspects may allow AI models to automatically segment regions of images and anatomical landmarks in ultrasound images and adaptively generate modified images for learning invariances across various imaging artifacts.

Non-limiting embodiments or aspects may provide for active data modification of ultrasound image data using robotic control. Non-limiting embodiments or aspects may train a segmentation model in an online or real-time manner during scanning and image data capture. The captured image data may be used to model where to search for new data and drive the motion of a robot or robotic system. In some non-limiting embodiments, the modeling of information of where to search next for additional image data may use a Gaussian process or other related process that represents the mean and uncertainty of a current belief of the captured image data. In some non-limiting embodiments or aspects, a highest mean, upper confidence bound, or expected improvement measure may be used. As new image data is captured, a mean map and an uncertainty map are updated. In some non-limiting embodiments or aspects, the mean map and uncertainty map may be used as input to a CNN or other AI model to determine where to drive the motion of the robotic system to capture additional image data. In some non-limiting embodiments or aspects, the uncertainty maps may be output from a BTSN or other BNN. Non-limiting embodiments or aspects provide for a robot or robotic system including robotic control that may learn based on the captured image data such that the robotic system may manipulate the subject of the image capture to represent previously captured images in the model's training domain or to capture image data outside of the model's training domain. In some non-limiting embodiments or aspects, a teacher AI model may be used to correct the AI model driving the motion of the robotic system if the AI model's path progresses away from a desired course. As such, non-limiting embodiments or aspects may allow AI models to be trained in real-time while capturing image data while also training a robotic control system to assist in improvement of the AI model training process.

Non-limiting embodiments or aspects may train an AI model by modifying captured image data to produce adversarial image data or generating adversarial image data for training. In some non-limiting embodiments or aspects, the adversarial image data may be generated based on disentangled data representations and independent latent vectors determined based on the captured image data. The independent latent vectors may represent a single degree of change in the image data or some other property related to the captured image data. In some non-limiting embodiments, the latent vector representations may be used to modify captured image data into adversarial images. As such, the modified adversarial images may be used as input to train an AI model in a way which the AI model may be used in real-world scenarios. In some non-limiting embodiments, this would provide for the production of new training image data to use for model training without having to capture image data in a real-world scenario. Desired training domains may be specified by setting the latent vector representations.

Non-limiting embodiments or aspects may be implemented as software applications capable of processing medical image data output by a medical imaging device. In other non-limiting embodiments, the system for generalizing ultrasound data may be incorporated directly into an ultrasound device as hardware and/or software or may be incorporated in another medical imaging device.

Referring now to FIG. 1, shown is a system 1000 for generalizing across variations in image data according to non-limiting embodiments or aspects. The system 1000 may include modification engine 100, imaging device 102, captured image data 104, training image data 105, machine learning (ML) model 106, and database 108. In non-limiting embodiments or aspects, imaging device 102 may be any type of imaging device configured to capture medical images of a subject, such as an optical coherence tomography (OCT) scanner, an ultrasound scanner, or the like. For example, imaging device 102 may include an ultrasound device configured to physically capture ultrasonic waveform data (e.g., RF waveform data). In non-limiting embodiments or aspects, imaging device 102 may preserve (e.g., store, communicate, and/or the like) only certain data associated with the RF waveform data (e.g., the RF waveform's amplitude envelope and/or the like), which may be used to create a greyscale ultrasound image. For example, raw, per-element RF waveforms may be combined into beam-formed RF waveforms, and the envelopes of the beam-formed RF waveforms may form the basis of the greyscale ultrasound images (e.g., for display on a screen and/or the like). Additionally or alternatively, the frequency content may be used by imaging device 102 to compute Doppler-shifts to measure velocities (e.g., which may be displayed in color). In non-limiting embodiments or aspects, the original RF waveform data may be discarded after certain data (e.g., envelope, Doppler-shift, and/or the like) have been computed (e.g., derived, determined, and/or the like). Additionally or alternatively, imaging device 102 may preserve the RF waveform data for an additional analysis (e.g., save, analyze, and/or the like RF waveform data). In non-limiting embodiments or aspects, imaging device 102 may include an ultrasound device that captures and preserves RF waveform data (e.g., beam-formed RF waveform data, per-element RF waveform data, any other suitable representation of the RF waveform (e.g., that preserves frequency content), and/or the like). Additionally or alternatively, the RF waveform data may be used in real-time for online analysis, may be saved for later analysis, and/or the like. In non-limiting embodiments or aspects, imaging system 102 may include a portable ultrasound machine, such as a crystal-linear array scanner. For example, imaging device 102 may include a Clarius L7 portable ultrasound machine. In some non-limiting embodiments or aspects, imaging device 102 may include a non-crystal micro-electromechanical system (MEMS) based and/or multi-function ultrasound machine. For example, imaging device 102 may include a Butterfly iQ+ ultrasound machine. In non-limiting embodiments or aspects, imaging device 102 may be used to obtain captured image data 104 (e.g., greyscale image frames and/or the like) from at least one sample. For example, a clinician may use imaging device 102 to obtain such images from a human subject. Additionally or alternatively, imaging device 102 may output captured image data 104, which may include at least one ultrasound image or a plurality of ultrasound image frames. In non-limiting embodiments or aspects, imaging device 102 may include one or more devices capable of receiving information from and/or communicating information to modification engine 100 and/or other devices.

Captured image data 104 may include a sequence of ultrasound image frames, medical image frames, and/or the like. Captured image data 104 may include image frames with differences due to imaging settings, operating of imaging device 102, anatomies, and/or drastic additions of artifacts, such as in medical injury scenarios. Captured image data 104 may be captured by imaging device 102 and communicated to modification engine 100 in real-time. Additionally or alternatively, captured image data 104 may be saved for later communication to modification engine 100. In some non-limiting embodiments, captured image data 104 may be input into modification engine 100 for processing. Captured image data 104 may be processed by modification engine 100 by modifying captured image data 104 to produce training image data 105. Additionally or alternatively, captured image data 104 may be processed by modification engine 100 by copying captured image data 104 or by copying individual frames from captured image data 104 and generating training image data 105.

Modification engine 100 may include, for example, software and/or hardware configured to receive information from imaging device 102 (e.g., captured image data), communicate information to the imaging device 102 (e.g., such as information to control the imaging device 102), and process the image data (e.g., modify the image data). For example, modification engine 100 may be one or more software applications executing on one or more computing devices. In non-limiting embodiments or aspects, modification engine 100 may implement at least one convolutional neural network (e.g., W-Net, U-Net, AU-Net, SegNet, and/or the like), as described herein. In non-limiting embodiments or aspects, modification engine 100 may implement at least one Bayesian neural network (BNN) or other type of probabilistic graphical model, as described herein. In non-limiting embodiments or aspects, modification engine 100 may receive captured image data 104 from imaging device 102 in real-time. Additionally or alternatively, modification engine 100 may receive (e.g., retrieve, obtain, query, and/or the like) captured image data 104 (e.g., historical captured image data), which may include at least one ultrasound image frame, as described herein) from previously stored captured image data 104.

In non-limiting embodiments or aspects, modification engine 100 may process captured image data 104 to produce training image data 105. Modification engine 100 may generate training image data 105 based on copying some or all frames of captured image data 104 and processing those copied frames. In some non-limiting embodiments, when modification engine 100 generates training image data 105, an unmodified copy of capture image data 104 may remain stored. In some non-limiting embodiments, when modification engine 100 generates training image data 105, training image data 105 may contain a mix of both modified and unmodified image data 104. In some non-limiting embodiments or aspects, modification engine 100 may direct imaging device to capture training data 105 based on captured image data 105. For example, modification engine 100 may generate uncertainty maps based on captured image data 104 and modification engine 100 may use the uncertainty maps as input to at least one CNN or BNN to determine whether to collect additional image data in the form of captured image data 104 or training data 105. In non-limiting embodiments or aspects, modification engine 100 may drop or remove frames or sequences of frames within captured image data 104, either randomly or based on a predefined pattern (e.g., every other frame or the like). Modification engine 100 may do this by either modifying captured image data 104 directly to produce training image data 105 or modification engine 100 may generate training image data 105 by copying the removed frames or sequences to a newly generated sequence of image data. Sequences in captured image data 104 and/or training image data 105 may include subsequences. Additionally or alternatively, modification engine 100 may modify captured image data 104 by altering the amount of time between any two images of captured image data 104. Additionally or alternatively, modification engine 100 may add a subsequence of frames to captured image data 104. For example, modification engine 100 may add at least one copy of existing frames of captured image data 104 to captured image data 104. In other non-limiting embodiments or aspects, modification engine 100 may generate composite frames created from one or more existing frames of captured image data 104. In some non-limiting embodiments, modification engine 100 may generate interpolated frames to appear between existing frames in captured image data 104. Modification engine 100 may generate new frames not included in captured image data 104 based on independent factors, such as latent vector representations, pre-existing data, and/or the like.

In non-limiting embodiments or aspects, training image data 105 may include a sequence of ultrasound image frames or other medical imaging frames. Training image data 105 may include image frames with differences due to processing by modification engine 100. Training image data 105 may be generated by modification engine 100 or may be a modified version of captured image data 104 created by modification engine 100. In some non-limiting embodiments or aspects, training image data 105 may include newly captured image data captured by imaging device 102. In some non-limiting embodiments or aspects, training image data 105 may be input into modification engine 100 for processing. In some non-limiting embodiments or aspects, training image data 105 may be processed by modification engine 100 by modifying training image data 105 or to produce uncertainty maps and/or additional training data. Training image data 105 may be input into ML model 106 for training ML model 106.

In non-limiting embodiments or aspects, ML model 106 may be separate from imaging device 102, such as one or more software applications executing on one or more computing devices in communication with the imaging device 102. Alternatively, ML model 106 may be incorporated (e.g., completely, partially, and/or the like) into imaging device 102, such that the ML model 106 is implemented by the software and/or hardware of imaging device 102. In some non-limiting embodiments or aspects, ML model 106 may be incorporated into modification engine 100, such that ML model 106 is implemented by the software and/or hardware of modification engine 100, or ML model 106 may be separate from modification engine 100. ML model 106 may receive training image data 105 as input. ML model 106 may be integrated with one or more devices capable of receiving information from and/or communicating information to database 108. In some non-limiting embodiments or aspects, ML model 106 may receive data from database 108. Data received from database 108 may include latent vector representations, uncertainty maps, pre-existing image data (e.g., historical ultrasound image data), and/or the like.

Database 108 may include one or more devices capable of receiving information from and/or communicating information to ML model 106 and/or the like. In non-limiting embodiments or aspects, database 108 may store captured image data 104 (e.g., historical ultrasound image data) from previous image captures (e.g., by imaging device 102, other ultrasound and/or RF systems, and/or the like). For example, the (historical) captured image data 104 may include at least one ultrasound image frame. In non-limiting embodiments or aspects, previously captured image data may be provided to database 108 to be stored as historical image data. Additionally or alternatively, such previously captured image data may be used for training and/or testing ML model 106 (e.g., to determine how accurately ML model 106 has learned generalized features such as anatomical landmarks, to determine what generalized features are within the strengths or weaknesses of ML model 106, and/or the like), as described herein.

In non-limiting embodiments or aspects, imaging device 102, ML model 106, and database 108 may be implemented (e.g., completely, partially, and/or the like) by a single computing device, a single system, and/or the like.

Figure 2:
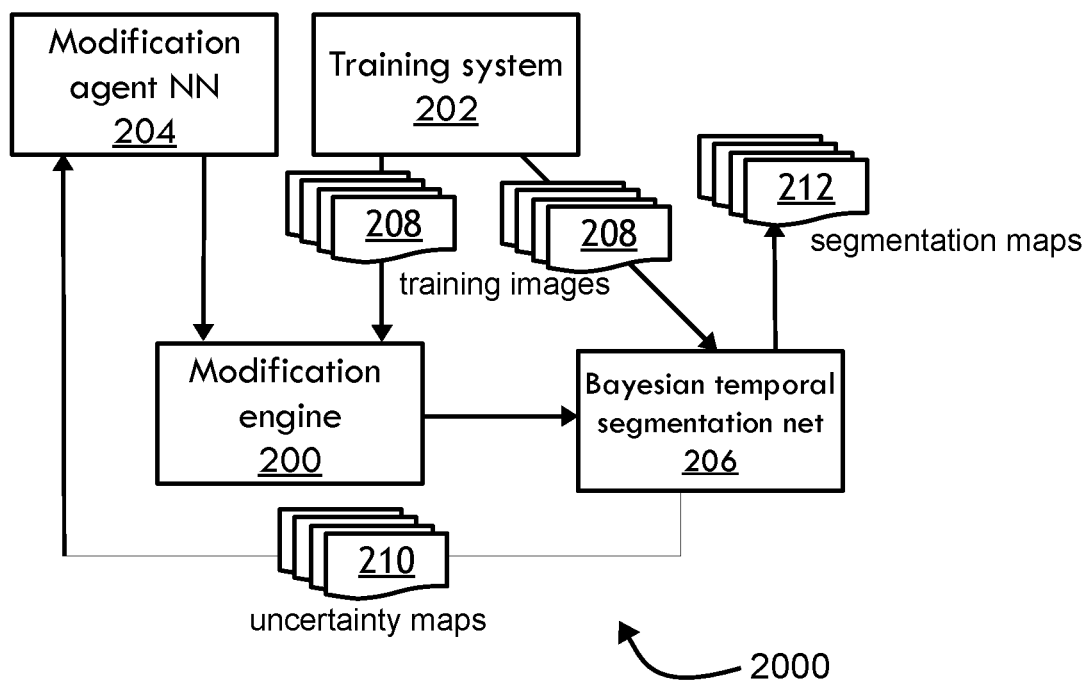
FIG. 2 illustrates a system for training a machine-learning-based AI model using spatial image deformations according to non-limiting embodiments or aspects.

Referring now to FIG. 2, shown is a system 2000 for training a machine-learning-based AI model using spatial image deformations according to non-limiting embodiments or aspects. In non-limiting embodiments or aspects, system 2000 may include modification engine 200, training system 202, modification agent neural network (NN) 204, Bayesian temporal segmentation network (BTSN) 206, training images 208, uncertainty maps 210, and segmentation maps 212. Modification engine 200 may include a CNN (e.g., W-Net, U-Net, AU-Net, SegNet, any combination thereof, and/or the like). In some non-limiting embodiments or aspects, modification engine 200 may be the same as or similar to modification engine 100 described herein. In non-limiting embodiments or aspects, modification engine 200 may generate synthetic images for further training using image deformations. For example, modification engine 200 may generate synthetic images for training with image deformations using a variation of the moving least squares deformation method. In some non-limiting embodiments, modification engine 200 may receive a set of control points and a set of deformed control points from modification agent NN 204. Modification engine 200 may apply the set of control points and the set of deformed points to an input image received from training system 202 to generate a synthetic image including image deformation.

As shown in FIG. 2, training system 202 may include and output training images 208. Training system 202 may include, for example, a computing device and/or data storage device storing image data. Training images 208 may be obtained from a real-time capture of images or training images 208 may be stored images that were previously captured. Training system 202 may communicate training images 208 to modification engine 200 for modifying training images 208 with image deformations produced by modification agent NN 204. In other non-limiting embodiments, training system 202 may communicate training images 208 to BTSN 206 for training. As such, image deformations may be used to spot-modify training images 208 in such a way that BTSN 206 is challenged in areas where it may have already learned particular features of training images 208.

With continued reference to FIG. 2, according to non-limiting embodiments or aspects, modification agent NN 204 may be a CNN such as a 3D CNN. In some non-limiting embodiments or aspects, modification agent NN 204 may be the same as or similar to modification engine 100, 200 and/or ML model 106 described herein. Modification agent NN 204 may include a plurality of convolutional blocks. Modification agent NN 204 may include a 3D convolutional layer, a batch normalization layer, rectified linear unit (ReLU) activation, a max pooling layer, and/or the like. In some non-limiting embodiments or aspects, modification agent NN 204 may be the same as or similar to modification engine 100 or ML model 106 described herein. In some non-limiting embodiments or aspects, modification agent NN 204 may be used to generate control points and deformed control points, the control points used to modify training images 208 with image deformations. In some non-limiting embodiments or aspects, modification agent NN 204 may generate new training images modified with deformations by creating copies of the input training images and applying deformations to the copies of the input training images. In some non-limiting embodiments or aspects, modification agent NN 204 may directly modify the input training images 208 by applying deformations. In some non-limiting embodiments or aspects, unmodified copies of training images 208 may remain stored. In some non-limiting embodiments, to generate synthetic images, modification agent NN 204 may generate a first set of control points around the border of an image from a sequence of captured image data. In order to generate control points and modify training images 208, modification agent NN 204 may receive uncertainty maps from BTSN 206 which may be used to determine and output a set of directions to shift the control points applied to the input images. Each control point may receive an individual directional shift. Directional shifts may include straight top-down and left-right directional shifts as well as additional degrees of freedom. The points representing the new location of the control points following the directional shift are included as deformed control points. Modification agent NN 204 may generate a second set of control points around individual anatomical classes detected in the training image. Modification agent NN 204 may also generate a set of deformed control points, where the deformed control points define the image deformation using the best affine transformation $l_v(x)$ which may minimize the following:

$$\sum_i w_i |l_v(p_i) - q_i|^2$$

where $p_i$ represents the first and second set of control points, $q_i$ represents the set of deformed control points, and $w_i$ represents the set of deformation weights, which are dependent on the point of evaluation v. The modification agent NN 204 may generate the deformed control points using as input an uncertainty map, for example, an epistemic uncertainty map. The control points and deformed control points may then be applied to training images 208 to produce new training images with transformed aspects. In some non-limiting embodiments or aspects, the Moving Least Squares Image Deformation method is used to apply the control points, deformed control points, and deformations to training images 208. Representing $l_v(x)$ as an affine transformation with a linear transformation matrix, M, and a translation value, T, the translation value can be solved for using the weighted centroids for linear moving least squares deformation, $$T = q_* - p_* M$$

where, $$p_* = \frac{\sum_i w_i p_i}{\sum_i w_i}$$

$$q_* = \frac{\sum_i w_i q_i}{\sum_i w_i}$$

where $p_*$ and $q_*$ are the weighted centroids used for the linear moving least squares deformation. In some non-limiting embodiments or aspects, the control points and deformed control points are split into a first control point set and a first deformed control point set for the borders of training images 208 and a second control point set and a second deformed control point set for the anatomical classes within training images 208. The control points designated for the borders of training images 208 are used to prevent the sides of the image from folding in during deformation. As the borders remain constant throughout the training process, the relationships for the weighted centroids can be written as:

$$p_* = \frac{\sum_i w_i p_i + w_B p_B}{\sum_i w_i + w_B}$$

$$q_* = \frac{\sum_i w_i q_i + w_B q_B}{\sum_i w_i + w_B}$$

where the subscript B refers to control points which are assigned to the border of a training image. The deformation weights may be pre-computed as:

$$w_i = \frac{1}{|p_i - v|^{2\alpha}}$$

along with additional values for computing the affine transformation which do not depend on each individual image for computation. In some non-limiting embodiments or aspects, the total count of control points may be set as hyperparameters to the modification agent NN 204.

Modification agent NN 204 may be trained based on how much (e.g., to a threshold degree or by a threshold percentage) modification agent NN 204 is able to challenge BTSN 206, which is measured by the loss on the modified training images. In some non-limiting embodiments or aspects, modification agent NN 204 may be trained by generating a random set of points and signaling a direction for the deformations of the control points. The Moving Least Squares Image Deformation may be computed for both the agent-generated (e.g., control points and deformed control points) and randomly-generated points. The segmentation loss may be computed for both sets. If the agent-generated points result in a lower segmentation loss, then the randomly-generated points may be assumed as more difficult. The more difficult points are assigned as the label for training the modification agent NN 204. If the randomly-generated points result in a lower loss, however, the opposite direction of the agent-generated points is assigned as the label for training.

With continued reference to FIG. 2, according to non-limiting embodiments or aspects, BTSN 206 may be the same as or similar to ML model 106 described herein. BTSN 206 may include a dropout-based Bayesian formulation of the 3D U-Net encoder-decoder architecture. BTSN 206 may include four convolutional blocks on the encoder side, with matching pairs on the decoder side. Each block may include an input layer followed by two pairs of the following: convolutional layer, batch normalization, and ReLU. Each block may further include a single dropout layer before the output layer. BTSN 206 may output two values (represented below), for both the predicted mean, $\hat{\mu}$, the segmentation map, and the predicted variance, $\hat{\sigma}^2$, which may be used for the epistemic uncertainty map:

$$[\hat{\mu}, \hat{\sigma}^2] = f^{\hat{W}}(x)$$

where f is the Bayesian 3D U-Net parameterized by model weights $\hat{W}$. The epistemic uncertainty maps are obtained using test-time stochastic forward passes, also referred to as Monte Carlo dropout:

$$\frac{1}{T}\sum_{t=1}^{T}(\hat{\mu}_t - \overline{\mu})^{\otimes 2}$$

where T is the total number of Monte Carlo samples and $$\overline{\mu} = \sum_{t=1}^{T} \frac{\hat{\mu}_t}{T}.$$

In some non-limiting embodiments or aspects, BTSN 206 may receive training images 208 as input for training. Training images 208 may be modified training images or original training images before modification. In some non-limiting embodiments or aspects, BTSN 206 may receive modified training images from modification engine 200 as input for training. BTSN 206 may produce, as output, segmentation maps of training images 208 or other modified training images. BTSN 206 may produce, as outputs, uncertainty maps which may be communicated to modification agent NN 204 for training modification agent NN 204 and for generating control points for image modification.

In non-limiting embodiments or aspects, uncertainty maps 210 may include epistemic uncertainty maps, aleatoric uncertainty maps, and/or the like. Uncertainty maps 210 may be communicated from BTSN 206 to modification agent NN 204. Uncertainty maps 210 may be fed as input to modification agent NN 204 for training and for generating control points for image deformation.

Figure 3:
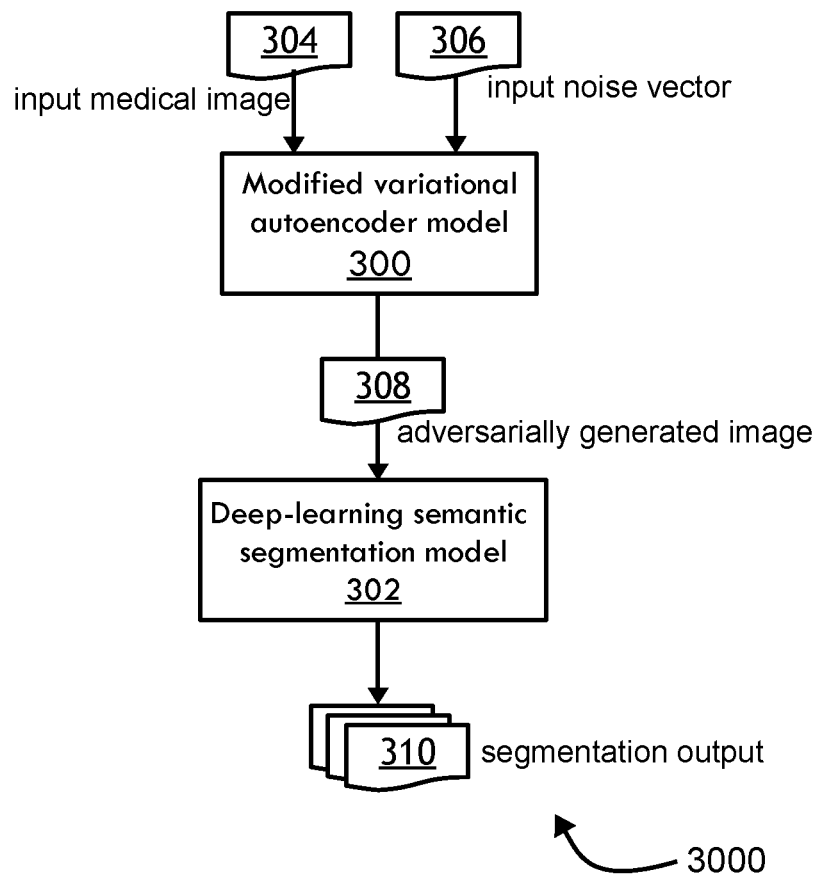
FIG. 3 illustrates a system for training a machine-learning-based AI model using adversarial image data modifications according to non-limiting embodiments or aspects.

Referring now to FIG. 3, shown is a system 3000 for training a machine-learning-based AI model using adversarial image data modifications (e.g., images modified to deceive the AI model) according to non-limiting embodiments or aspects. In some non-limiting embodiments or aspects, system 3000 may include modified variational autoencoder model (MVAM) 300, deep-learning semantic segmentation model (DLSSM) 302, input medical image 304, input noise vector 306, adversarially generated image 308, and segmentation output 310. System 3000 may use disentangled data representations in the form of latent vectors such that each vector dimension may represent a single degree of change in image data. In some non-limiting embodiments or aspects, system 3000 may be used in real-time (e.g., concurrent with image capture) to train a machine-learning-based AI model. In some non-limiting embodiments or aspects, system 3000 may be used to train a machine-learning based AI model using previously captured image data.

In some non-limiting embodiments or aspects, MVAM 300 may be the same as or similar to modification engine 100, 200 described herein. In some non-limiting embodiments or aspects, DLSSM 302 may be the same as or similar to ML model 106 described herein. DLSSM 302 may include a variant of a deep learning-based semantic segmentation model. Input medical image 304 may be the same as or similar to captured image data 104 described herein. In some non-limiting embodiments or aspects, input medical image 304 may include a single image, a sequence of image frames, or raw image data. In some non-limiting embodiments or aspects, input noise vector 306 may include a plurality of dimensions. Input noise vector 306 may include dimensions independent of other dimensions. Each dimension of input noise vector 306 may represent a single degree of change in image data. In some non-limiting embodiments or aspects, dimensions may be preselected to represent a target domain. In some non-limiting embodiments or aspects, dimensions of input noise vector 306 may be drawn from a distribution. Adversarially generated image 308 may include image data modified with input noise vector 306. In some non-limiting embodiments, adversarially generated image 308 may be the same as input medical image 304 in that adversarially generated image 308 had no modification applied because dimensions of input noise vector 306 may be drawn from a distribution (hence dimensions may represent a state of no addition of noise). Adversarially generated image 308 may include perceptible differences in the image when compared to input medical image 304 following modification by MVAM 300.

According to non-limiting embodiments, MVAM 300 may receive input medical image 304 and input noise vector 306 as inputs. MVAM 300 may decode the inputs into adversarially generated image 308. Input noise vector 306 may independently transform spatial features of input medical image 304, such as anatomical shapes, sizes, imaging settings, and/or the like. Adversarially generated image may be fed as input to DLSSM 302 for training. DLSSM 302 may output segmentation output 310 which may be more interpretable as training of DLSSM 302 progresses.

Figure 4:
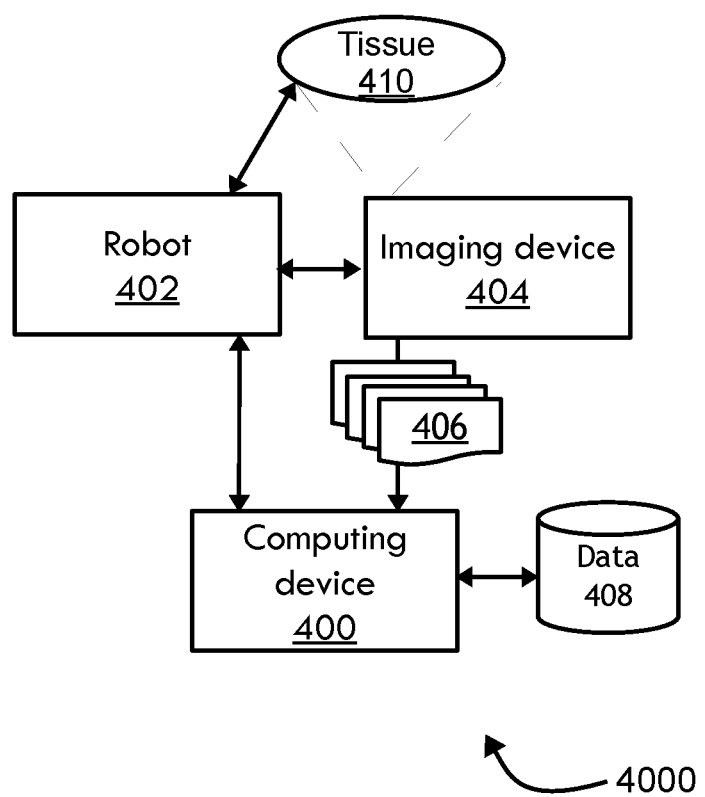
FIG. 4 illustrates a system for training a machine-learning-based AI model using active data modification with robotic control according to non-limiting embodiments or aspects.

Referring now to FIG. 4, shown is a system 4000 for training a machine-learning-based AI model using active data modification with robotic control according to non-limiting embodiments or aspects. In some non-limiting embodiments or aspects, system 4000 may include computing device 400, robot 402, imaging device 404, training image data 406, and database 408. In some non-limiting embodiments or aspects, computing device 400 may be the same as or similar to modification engine 100 described herein. In some non-limiting embodiments or aspects, computing device 400 may be the same as or similar to ML model 106 described herein. Computing device 400 may include or be in communication with an ML model which may be trained. Robot 402 may include a robotic arm, robotic manipulator, and/or robotic tool capable of manipulating (e.g., pressing, deforming, pushing, probing, expanding, contracting, and/or the like) tissue 410. In some non-limiting embodiments or aspects, robot 402 may include a computing device to control the movement of robot 402. In other non-limiting embodiments or aspects, robot 402 may include a computing device, such as a controller, in communication with computing device 400 such that computing device 400 may control robot 402. Imaging device 404 may be the same as or similar to imaging device 102 described herein. Training image data 406 may be the same as or similar to captured image data 104 or training image data 105 described herein. Database 408 may be the same as or similar to database 108 described herein. In some non-limiting embodiments or aspects, tissue 410 may include living or dead tissue of a subject being scanned such as human tissue, animal tissue, synthetic tissue, and/or the like.

With continued reference to FIG. 4, according to non-limiting embodiments or aspects, computing device 400 may apply a Gaussian process to process and analyze input data, such as training image data 406. In some non-limiting embodiments, computing device 400 may apply another process which may represent the mean, best estimate, uncertainty, and/or covariance of a current belief of the collected data or training image data 406 being collected. For example, computing device 400 may apply a highest mean, upper confidence bound, and/or expected improvement measures to the collected data. A belief of training image data 406 or other collected training data (e.g., location data collected by robot 402 and imaging device 404) may include an estimate of desired information which may be used to further train computing device 400 and direct robot 402 for where to search for new image data for capture. In some non-limiting embodiments or aspects, the best estimate and uncertainty of the estimate may be used by computing device 400 to assess the training image data quality. In some non-limiting embodiments or aspects, the best estimate and uncertainty of the estimate may be represented by epistemic uncertainty maps and aleatoric uncertainty maps output from a Bayesian segmentation model.

In some non-limiting embodiments or aspects, robot 402 may be configured to autonomously acquire training image data of tissue 410. In some non-limiting embodiments or aspects, computing device 400 may be configured to control robot 402 such that robot 402 autonomously acquires training image data.

In some non-limiting embodiments or aspects, while using the best estimate and uncertainty of the estimate, robot 402 may be trained such that it is capable of manipulating tissue 410 to represent a current training domain of a first ML model of computing device 400. The manipulation of tissue 410 may be applied such that tissue 410 may resemble what the first ML model of computing device 400 has previously learned. For example, if the first ML model has learned a trained size of arteries, robot 402 may be used to compress or expand the artery to the trained size for further data capture with imaging device 404. In some non-limiting embodiments or aspects, robot 402 may be used such that it moves imaging device 404 to areas of tissue 410 where the first ML model has not been trained or requires additional training. In some non-limiting embodiments, system 4000 or computing device 400 may include a teacher ML model. The teacher ML model may be capable of correcting the first ML model if the first ML model propagates undesirable errors causing the system to surpass an error threshold. Errors may include errors detected by the first ML model or teacher ML model in the training image data 406, or other collected training data.

According to non-limiting embodiments or aspects, computing device 400 may create a map of the training image data collected based on the image quality of the training image data. Image quality may include the overall image quality of training image data 406. Image quality may include interpretability of training image data 406. In some non-limiting embodiments or aspects, computing device 400 may coordinate acquisition of new training image data 406. Coordinating acquisition of training image data 406 may include any of the described methods such as directing robot 402 to manipulate tissue 410 based on what the first ML model has previously learned. Coordinating acquisition of training image data 406 may be or based on weak training domains of the first ML model or where the first ML model has not been trained. Coordinating acquisition may be based on the commands of the teacher ML model and/or the best estimate and uncertainty of the estimate of desired information that should be collected for training.

Figure 5:
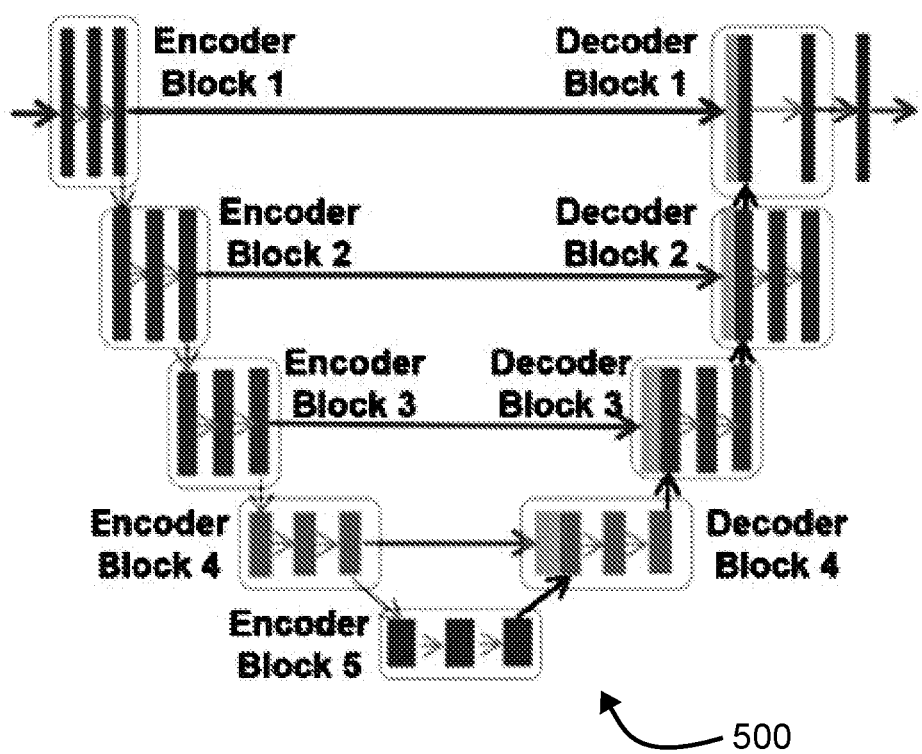
FIG. 5 illustrates a method for training a machine-learning-based AI model according to non-limiting embodiments or aspects.

Referring now to FIG. 5, shown is an exemplary artificial neural network 500 (e.g., U-Net CNN architecture) according to non-limiting embodiments or aspects. Artificial neural network 500 may include a recurrent neural network, feed-forward neural network, long-short-term-memory neural network, Bayesian network, Bayesian neural network, transformer network, auto-encoder network, deep Boltzmann machine, deep belief network, random forest, Bayesian random forest, gradient boosted regression tree, segmentation network, semantic segmentation network, Bayesian segmentation network, or any combination thereof. Artificial neural network 500 may include a 3D U-Net architecture, batch normalization and ReLU activation, and may include a downsampling layer as the last layer of the encoder block. Each decoder block may include an upsampling layer followed by two pairs of convolution layers, batch normalization, convolutional LSTM layers, and ReLU activation in the encoder block. Each convolutional layer may include 3×3×3 kernel dimensions. Artificial neural network 500 may be implemented (e.g., completely, partially, and/or the like) by ML model 106, modification engine 200, modification agent NN 204, BTSN 206, DLSSM 302, and/or computing device 400. Additionally or alternatively, Artificial neural network 500 may be implemented (e.g., completely, partially, and/or the like) by at least one other computing device and/or direct implementation in (e.g., digital and/or analog) circuitry, separate from or including ML model 106, modification engine 200, modification agent NN 204, BTSN 206, DLSSM 302, computing device 400, and/or robot 402.

In non-limiting embodiments or aspects, artificial neural network 500 may be similar to the CNN described in Ronneberger et al., "U-net: Convolutional networks for biomedical image segmentation," International Conference on Medical Image Computing and Computer-Assisted Intervention, pp. 234-241 (2015).

Figure 6:
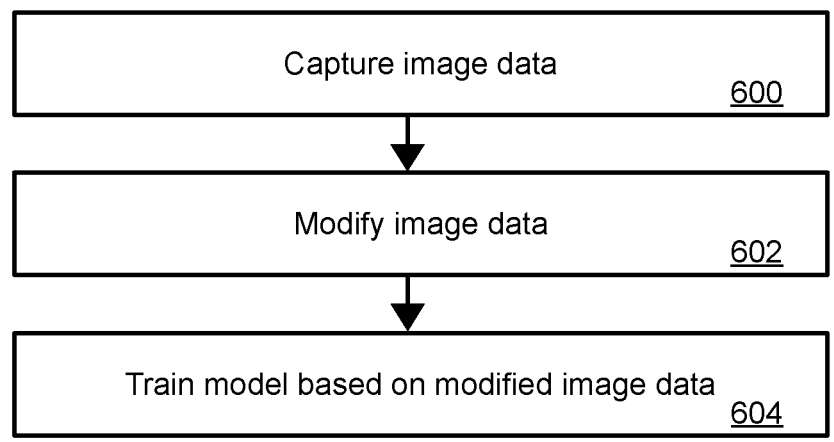
FIG. 6 is a flow diagram of a method for training a machine-learning-based AI model to handle diverse types of motions occurring during image acquisition according to non-limiting embodiments or aspects.

Referring now to FIG. 6, shown is a flow diagram of a method for training a machine-learning-based AI model to handle diverse types of motions occurring during image acquisition according to non-limiting embodiments or aspects. In some non-limiting embodiments or aspects, one or more of the steps of the method may be performed (e.g., completely, partially, and/or the like) by modification engine 100, modification engine 200, modification agent NN 204, BTSN 206, MVAM 300, DLSSM 302, and computing device 400. When referring to a modification engine AI model, it may be appreciated that described steps of non-limiting embodiments herein may be performed by any one of modification engine 100, modification engine 200, modification agent NN 204, BTSN 206, MVAM 300, DLSSM 302, and/or computing device 400. In some non-limiting embodiments or aspects, one or more of the steps of the method may be performed (e.g., completely, partially, and/or the like) by another system, another device, another group of systems, or another group of devices, separate from or including modification engine 100, such as ML model 106, computing device 400, and/or the like.

As shown in FIG. 6, at step 600, the method may include capturing image data as described herein. For example, imaging device 102, 404 may capture image data to result in a plurality of frames of captured image data. The captured image data may include image frames relative to other image frames based on motion between imaging device 102, 404 and tissue 410.

As shown in FIG. 6, at step 602, the method may include modifying image data as described herein. For example, modification engine 100 may modify the captured image data (e.g., image data 104, 406, and/or the like). Modifying the captured image data may result in modified image data (e.g. training image data 105, 208, 308, and/or the like). In non-limiting embodiments or aspects, modifying the captured image data may include altering an amount of time between any two frames of the captured image data. Altering an amount of time between any two frames of the captured image data may include adding one or more frames between any two images of the captured image data. The one or more frames may be duplicate frames copied or removed from the captured image data or a new frame. Alternatively, the one or more frames may include frames generated by any of the methods described herein. In non-limiting embodiments or aspects, modifying the captured image data may include removing a subsequence of frames from the captured image data and creating a generated image sequence that may be used for training. In some non-limiting embodiments or aspects, subsequences of image data may be generated by stochastically dropping every other frame or randomly selected frames. For example, a sequence for training may be generated by selecting random frames from a captured image data sequence and combining the selected frames into a new sequence. In some non-limiting embodiments, modifying captured image data may include adding a subsequence of one or more new frames to the sequence of captured image data. In some non-limiting embodiments or aspects, the new frames may include a copy of at least one frame of the captured image data, a composite frame created from other frames in the captured image data, an interpolated frame generated to appear to have been between other frames, a frame that is not included in the original captured image data, or any combination of such frames.

As shown in FIG. 6, at step 604, the method may include training a model based on the modified image data as described herein. For example, ML model 106 (or any other AI models described herein) may be trained with modification engine 100 by receiving the modified image data (e.g. training image data 105) from modification engine 100 as input to ML model 106.

Figure 7:
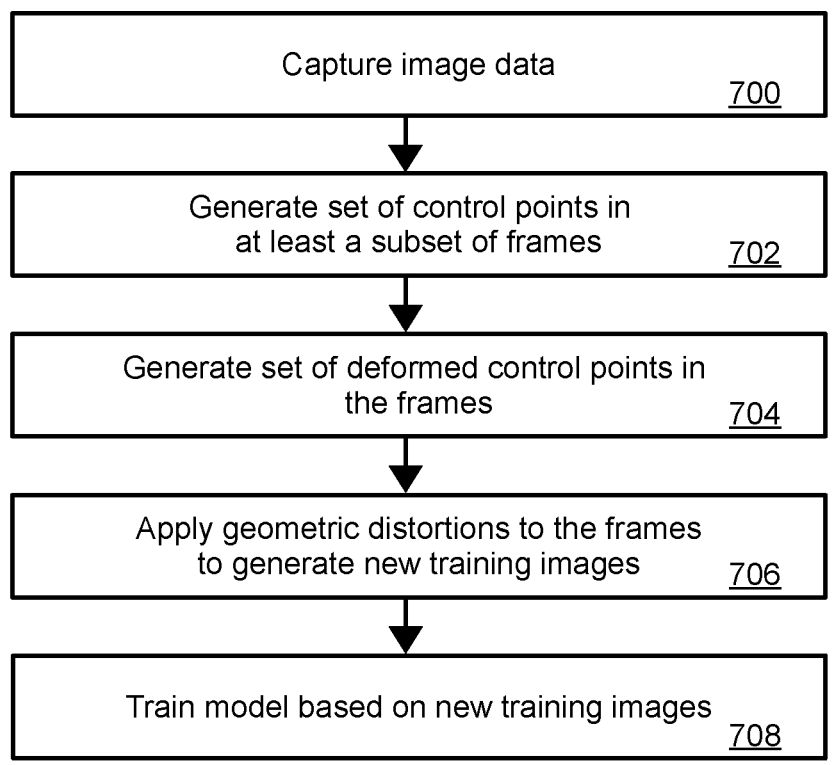
FIG. 7 is a flow diagram of a method for training a machine-learning-based AI model to handle diverse types of tissue appearances during medical imaging according to non-limiting embodiments or aspects.

Referring now to FIG. 7, shown is a flow diagram of a method for training a machine-learning-based AI model to handle diverse types of tissue appearances during medical imaging according to non-limiting embodiments or aspects. In some non-limiting embodiments or aspects, one or more of the steps of the method may be performed (e.g., completely, partially, and/or the like) by modification engine 100, imaging device 102, modification engine 200, modification agent NN 204, BTSN 206, MVAM 300, DLSSM 302, and computing device 400. When referring to a modification engine or AI model, it may be appreciated that described steps of non-limiting embodiments herein may be performed by any one of modification engine 100, modification engine 200, modification agent NN 204, BTSN 206, MVAM 300, DLSSM 302, and/or computing device 400. In some non-limiting embodiments or aspects, one or more of the steps of the method may be performed (e.g., completely, partially, and/or the like) by another system, another device, another group of systems, or another group of devices, separate from or including modification engine 100, such as ML model 106, computing device 400, and/or the like.

As shown in FIG. 7, at step 700, the method may include capturing image data as described herein. For example, imaging device 102, 404 may capture image data as a series of training medical images. The series of images may include a plurality of image frames in a sequence. The captured image data may include image frames relative to other image frames based on motion between imaging device 102, 404 and tissue 410.

As shown in FIG. 7, at step 702, the method may include generating a set of control points around each frame of the captured image data and around each classified object in each frame of at least a subset of frames in the plurality of frames captured as described herein. For example, modification engine 100 may generate a set of control points around the border of each frame in a subsequence of frames. The number of control points in the set of control points for both the border and the classified objects may each be set by hyperparameters of the model generating the set of control points. The sets of control points may be used to deform the captured image data to generate training image data. The sets of control points may be used to generate uncertainty maps by computing a segmentation loss against a set of randomly generated points.

As shown in FIG. 7, at step 704, the method may include generating a set of deformed control points around each frame of the captured image data and around each classified object in each frame of at least a subset of frames in the plurality of frames captured as described herein. For example, modification engine 100 may generate a set of deformed control points in each frame in a subsequence of frames to define the deformation of the image frame. The deformed control points may be generated based on an affine transformation.

As shown in FIG. 7, at step 706, the method may include applying geometric distortions to the frames to generate new training images. For example, modification engine 100 may generate a new subsequence of frames, each frame including a deformed portion of the frame based on the sets of control points and deformed control points. In some non-limiting embodiments, modification engine may apply distortions directly to captured image data 104 to produce training image data 105 such that captured image data 104 is modified. Applying distortions to the frames may use the Moving Least Squares Image Deformation method. In some non-limiting embodiments or aspects, the distortions may be partially defined by a translation value.

As shown in FIG. 7, at step 708, the method may include training a model based on the new training images. For example, modification engine 100 may send the new subsequence of deformed frames (e.g., training image data 105) to ML model 106 as input for training.

Figure 8:
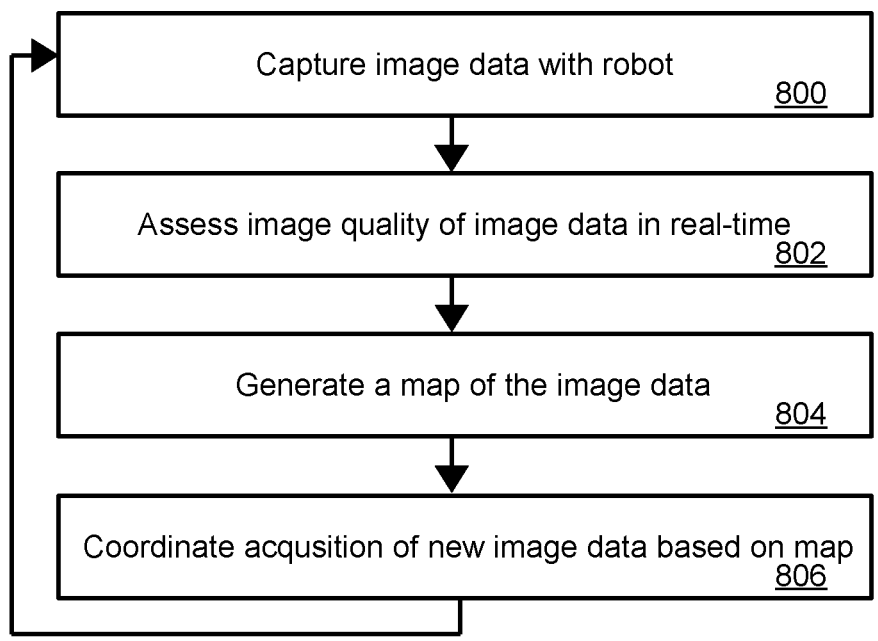
FIG. 8 is a flow diagram of a method for training a machine-learning-based AI model to handle diverse types and/or appearances of tissue during medical imaging by acquiring new training image data during training according to non-limiting embodiments or aspects.

Referring now to FIG. 8, shown is a flow diagram of a method for training a machine-learning-based AI model to handle diverse types and/or appearances of tissue during medical imaging by acquiring new training image data during training according to non-limiting embodiments or aspects. In some non-limiting embodiments or aspects, one or more of the steps of the method may be performed (e.g., completely, partially, and/or the like) by modification engine 100, imaging device 102, modification engine 200, modification agent NN 204, BTSN 206, MVAM 300, DLSSM 302, and computing device 400. When referring to a modification engine or AI model, it may be appreciated that described steps of non-limiting embodiments herein may be performed by any one of modification engine 100, modification engine 200, modification agent NN 204, BTSN 206, MVAM 300, DLSSM 302, and/or computing device 400. In some non-limiting embodiments or aspects, one or more of the steps of the method may be performed (e.g., completely, partially, and/or the like) by another system, another device, another group of systems, or another group of devices, separate from or including modification engine 100, such as ML model 106, computing device 400, and/or the like. In some non-limiting embodiments or aspects, the method shown in FIG. 8 may be repeated iteratively in real-time to train an AI model.

As shown in FIG. 8, at step 800, the method may include capturing image data with robot 402 described herein. For example, robot 402 may be configured to capture image data of a subject autonomously. Robot 402 may be in communication with one or more computing devices and one or more AI models. Robot 402 may capture image data by moving an imaging device relative to a subject. In some non-limiting embodiments or aspects, robot 402 may move to capture image data at locations on the subject based on the coordination of a computing device in communication with robot 402. In some non-limiting embodiments or aspects, robot 402 may capture image data by autonomously physically manipulating the subject to change the appearance of the captured image data to acquire desired training image data.

As shown in FIG. 8, at step 802, the method may include assessing image quality of the training image data. For example, image quality may be assessed in real-time as the training image data is acquired by robot 402 and the imaging device. In some non-limiting embodiments or aspects, image quality may be assessed asynchronously by a computing device in communication with robot 402 (e.g., computing device 400) after image data has been captured and/or stored. Assessing image quality may include assessing the interpretability of captured image data.

As shown in FIG. 8, at step 804, the method may include creating a map of the training image data. For example, the map may be created based on the image quality of the training image data. In some non-limiting embodiments or aspects, the map may include a mean map or an uncertainty map.

As shown in FIG. 8, at step 806, the method may include coordinating acquisition of new training image data by the robot. In some non-limiting embodiments or aspects, coordinating acquisition of new training image data by robot 402 may include computing device 400 receiving the map as input. Computing device 400 may use the measurements from the map to determine where to drive robot 402 to acquire new training image data. In some non-limiting embodiments or aspects, computing device 400 may coordinate acquisition of new training image data based on what the trained model already knows or has previously learned. In some non-limiting embodiments or aspects, computing device 400 may coordinate acquisition of new training image data based on domains outside of the current training domain. Domains outside of the current training domain may include any image feature that the model being trained has not learned.

Figure 9:
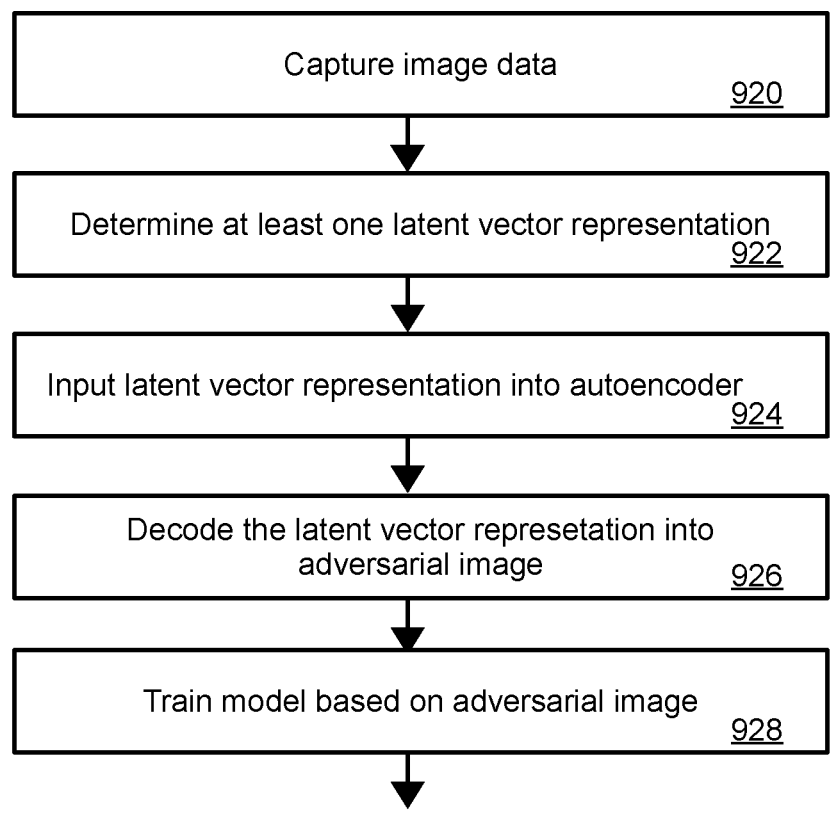
FIG. 9 is a flow diagram of a method for training a machine-learning-based AI model to handle diverse types of changes occurring during medical image acquisition according to non-limiting embodiments or aspects.

Referring now to FIG. 9, shown is a flow diagram of a method for training a machine-learning-based AI model to handle diverse types of changes occurring during medical image acquisition according to non-limiting embodiments or aspects. In some non-limiting embodiments or aspects, one or more of the steps of the method may be performed (e.g., completely, partially, and/or the like) by modification engine 100, imaging device 102, modification engine 200, modification agent NN 204, BTSN 206, MVAM 300, DLSSM 302, and computing device 400. When referring to a modification engine or AI model, it may be appreciated that described steps of non-limiting embodiments herein may be performed by any one of modification engine 100, modification engine 200, modification agent NN 204, BTSN 206, MVAM 300, DLSSM 302, and/or computing device 400. In some non-limiting embodiments or aspects, one or more of the steps of the method may be performed (e.g., completely, partially, and/or the like) by another system, another device, another group of systems, or another group of devices, separate from or including modification engine 100, such as ML model 106, computing device 400, and/or the like.

As shown in FIG. 9, at step 920, the method may include capturing image data as described herein. At step 922, the method may include determining at least one latent vector representation. Determining a latent vector representation may include determining the latent vector representation based on a target domain. The target domain may be considered difficult relative to what the model being trained has already learned. The target domain may include domains outside of the current training domain of the model being trained. In some non-limiting embodiments or aspects, latent vectors may be derived from image data using an AI model, such as a CNN including an encoder-decoder architecture with a bottleneck layer. The bottleneck layer may generate feature maps when processing image data which may be used as a latent space to derive the latent vector representations.

As shown in FIG. 9, at step 924, the method may include inputting the latent vector representations and captured image data into a variational autoencoder model (e.g., MVAM 300). In some non-limiting embodiments or aspects, the latent vector representations and captured image data may be input as a single image with associated vector representations. In some non-limiting embodiments or aspects, the latent vector representations and captured image data may be input as a sequence of frames of captured image data along with a sequence of vector representations corresponding to each frame. In some non-limiting embodiments or aspects, the latent vector representations include individual dimensions which may be independent to changes in other individual dimensions of the latent vector representations.

As shown in FIG. 9, at step 926, the method may include decoding the latent vector representations and the captured input data, using the variational autoencoder model (e.g., MVAM 300), into adversary image data. For example, MVAM 300 may encode the captured image data and apply the dimensions of the latent vector representation to the captured image data. MVAM 300 may then decode the capture image data modified with the latent vector representation into new training image data which may be used as adversary image data to train an AI model. In some non-limiting embodiments, when the latent vector representation is applied to the captured image data, various dimensions and/or representations of the latent vector may independently transform different spatial features of the input captured image data.

As shown in FIG. 9, at step 928, the method may include training an AI model (e.g., DLSSM 302) based on the adversary image data. For example, a sequence of frames of adversary image data may be input into an AI model for training on the areas of the captured image data which may have been modified with the latent vector representations.

Figure 10:
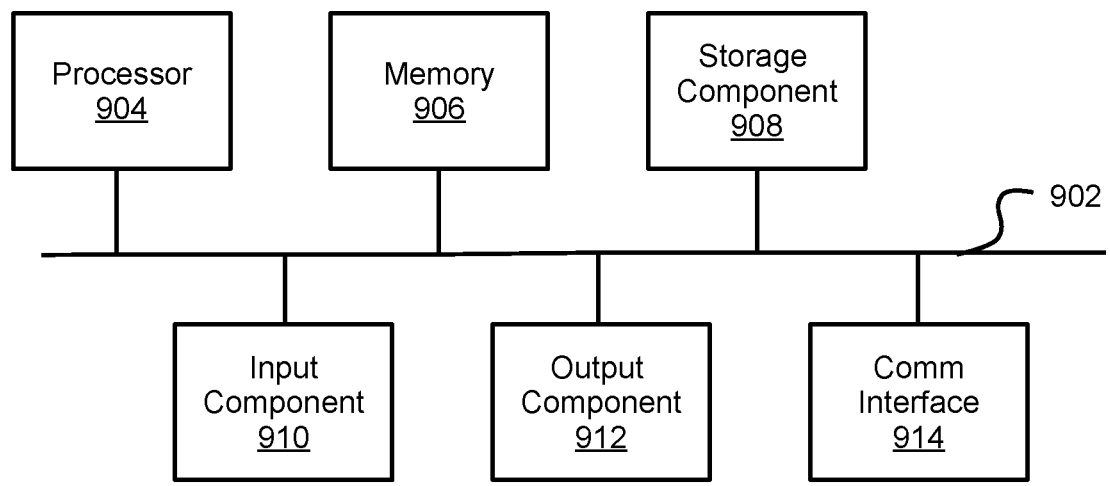
FIG. 10 is a schematic diagram of a computing device according to non-limiting embodiments or aspects.

Referring now to FIG. 10, shown is a diagram of example components of a device 900 according to non-limiting embodiments. Device 900 may correspond to the modification engines 100, 200, ML model 106, modification agent NN 204, MVAM 300, DLSSM 302, computing device 400, and/or robot 402, as examples. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 10. Additionally, or alternatively, a set of components (e.g., one or more components) of device 900 may perform one or more functions described as being performed by another set of components of device 900.

As shown in FIG. 10, device 900 may include bus 902, processor 904, memory 906, storage component 908, input component 910, output component 912, and communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 10, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method of training a machine-learning-based artificial intelligence (AI) model to handle diverse types of motions occurring during image acquisition, comprising:
capturing image data using an imaging device to result in a plurality of frames of captured image data, the captured image data comprising motion between the imaging device and tissue;
modifying, with a computing device, the captured image data, resulting in modified image data, by at least one of:
altering an amount of time between any two frames of the captured image data;
removing a randomized subsequence of frames from the captured image data; and
adding a subsequence of one or more new frames to the captured image data, each of the one or more new frames comprising at least one of: a copy of at least one frame of the captured image data, a composite frame created from other frames in the captured image data, an interpolated frame generated to appear between other frames in the captured image data, a frame that is not included in the captured image data, or any combination thereof; and
training, with a computing device, a machine-learning-based AI model based on the modified image data.

2. The method of claim 1, wherein the image data is captured in real-time or was previously captured.

3. The method of claim 1, wherein modifying the captured image data comprises removing a subsequence of frames from the captured image data, the method further comprising:
  determining a probability value for each frame of the captured image data; and
  determining the subsequence of frames of the captured image data by comparing the probability value of each frame to a predetermined probability threshold value.

4. The method of claim 1, wherein modifying the captured image data comprises removing the randomized subsequence of frames from the captured image data, the method further comprising:
  selecting a range of frames from the captured image data;
  generating a random integer having a value greater than or equal to a first frame number of the range of frames and less than or equal to one greater than a final frame of the range of frames; and
  determining a selected frame for the randomized subsequence of frames based on the random integer.

5. The method of claim 1, wherein modifying the captured image data comprises adding a subsequence of one or more new frames to the captured image data, the method further comprising:
  randomly generating a temporal shift of a predetermined length;
  splitting the captured image data into a plurality of subsequences equaling the predetermined length;
  generating a random integer for each subsequence of the plurality of subsequences; and
  spatially shifting at least one of a width and height of at least one frame of each subsequence of the plurality of subsequences based on the random integer corresponding to the subsequence.

6. The method of claim 1, wherein the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof.

7. A system for training a machine-learning-based artificial intelligence (AI) model to handle diverse types of motions occurring during video acquisition, comprising at least one computing device programmed or configured to:
  capture image data using an imaging device to result in a plurality of frames of captured image data, the captured image data comprising motion between the imaging device and tissue;
  modify the captured image data, resulting in modified image data, by at least one of:
    alter an amount of time between any two images of the captured image data;
    remove a randomized subsequence of frames from the captured image data; and
    add a subsequence of one or more new frames to the captured image data, each of the one or more new frames comprising at least one of: a copy of at least one frame of the captured image data, a composite frame created from other frames in the captured image data, an interpolated frame generated to appear to have been between other frames in the captured image data, a frame that is not included in the captured image data, or any combination thereof; and
  train a machine-learning-based AI model based on the modified image data.

8. The system of claim 7, wherein the image data is captured in real-time or was previously captured.

9. The system of claim 7, wherein modifying the captured image data comprises removing a subsequence of frames from the captured image data, the at least one computing device further configured to:
  determine a probability value for each frame of the captured image data; and
  determine the subsequence of frames of the image data by comparing the probability value of each frame to a predetermined probability threshold value.

10. The system of claim 7, wherein modifying the captured image data comprises removing the randomized subsequence of frames from the captured image data, the at least one computing device further configured to:
  select a range of frames from the captured image data;
  generate a random integer having a value greater than or equal to a first frame number of the range of frames and less than or equal to one greater than a final frame of the range of frames; and
  determine a selected frame for the randomized subsequence of frames based on the random integer.

11. The system of claim 7, wherein modifying the captured image data comprises adding a subsequence of one or more new frames to the captured image data, the at least one computing device further configured to:
  randomly generate a temporal shift magnitude of a predetermined length;
  split the captured image data into a plurality of subsequences equaling the predetermined length;
  generate a random integer for each subsequence of the plurality of subsequences; and
  spatially shift at least one of a width and height of at least one frame of each subsequence of the plurality of subsequences based on the random integer corresponding to the subsequence.

12. The system of claim 7, wherein the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof.

13. A computer program product for training a machine-learning-based artificial intelligence (AI) model to handle diverse types of motions occurring during video acquisition, comprising at least one non-transitory computer-readable medium including program instructions that, when executed by at least one computing device, cause the at least one computing device to:

capture image data using an imaging device to result in a plurality of frames of captured image data, the captured image data comprising motion between the imaging device and tissue;

modify the captured image data, resulting in modified image data, by at least one of:

alter an amount of time between any two images of the captured image data;

remove a randomized subsequence of frames from the captured image data; and add a subsequence of one or more new frames to the captured image data, each of the one or more new frames comprising at least one of: a copy of at least one frame of the captured image data, a composite frame created from other frames in the captured image data, an interpolated frame generated to appear to have been between other frames in the captured image data, a frame that is not included in the captured image data, or any combination thereof; and train a machine-learning-based AI model based on the modified image data.

14. The computer program product of claim 13, wherein the image data is captured in real-time or was previously captured.

15. The computer program product of claim 13, wherein modifying the captured image data comprises removing a subsequence of frames from the captured image data, the program instructions further causing the at least one computing device to:

determine a probability value for each frame of the captured image data; and determine the subsequence of frames of the image data by comparing the probability value of each frame to a predetermined probability threshold value.

16. The computer program product of claim 13, wherein modifying the captured image data comprises removing the randomized subsequence of frames from the captured image data, the program instructions further causing the at least one computing device to:

select a range of frames from the captured image data;

generate a random integer having a value greater than or equal to a first frame number of the range of frames and less than or equal to one greater than a final frame of the range of frames; and determine a selected frame for the randomized subsequence of frames based on the random integer.

17. The computer program product of claim 13, wherein modifying the captured image data comprises adding a subsequence of one or more new frames to the captured image data, the program instructions further causing the at least one computing device to:

randomly generate a temporal shift magnitude for each subsequence of frames of a predetermined length;

split the captured image data into a plurality of subsequences equaling the predetermined length;

generate a random integer for each subsequence of the plurality of subsequences; and spatially shift at least one of a width and height of at least one frame of each subsequence of the plurality of subsequences based on the random integer corresponding to the subsequence.

18. The computer program product of claim 13, wherein the captured image data comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof, and wherein the machine-learning-based AI model comprises at least one of the following: a convolutional neural network, a recurrent neural network, a long-short-term-memory neural network, a Bayesian network, a Bayesian neural network, a transformer network, an auto-encoder network, a deep Boltzmann machine, a deep belief network, a random forest, a Bayesian random forest, a gradient boosted regression tree, or any combination thereof.

19. The method of claim 1, wherein modifying the captured image data comprises generating a copy of the captured image data and modifying the copy of the captured image data to form the modified image data.

* * * * *